US012706733B2

(12) United States Patent
Toscano et al.

(10) Patent No.: US 12,706,733 B2
(45) Date of Patent: Aug. 11, 2026

(54) METHODS AND APPARATUS FOR OPERATING A CONSTRAINED DEVICE

(71) Applicant: Telefonaktiebolaget LM Ericsson (publ), Stockholm (SE)

(72) Inventors: Orazio Toscano, Genoa (IT); Liuba Poli, Piombino (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 999 days.

(21) Appl. No.: 17/425,488

(22) PCT Filed: Mar. 7, 2019

(86) PCT No.: PCT/EP2019/055755
§ 371 (c)(1),
(2) Date: Jul. 23, 2021

(87) PCT Pub. No.: WO2020/177868
PCT Pub. Date: Sep. 10, 2020

(65) Prior Publication Data

US 2022/0085977 A1 Mar. 17, 2022

(51) Int. Cl.
*H04L 9/06* (2006.01)

(52) U.S. Cl.
CPC .................................. *H04L 9/0656* (2013.01)

(58) Field of Classification Search
CPC .................................................... H04L 9/0656
USPC .......................................................... 713/150
See application file for complete search history.

(56) References Cited

U.S. PATENT DOCUMENTS 5,091,942 A 2/1992 Dent
10,116,430 B1 * 10/2018 Jones ........................ H04L 1/08
2010/0135493 A1 6/2010 Yoon et al.
(Continued)

FOREIGN PATENT DOCUMENTS

CN 102752098 A * 10/2012
EP 1942599 A1 7/2008
WO WO-2010085066 A2 * 7/2010 ............ G06F 7/584

OTHER PUBLICATIONS

"MAX II Device Handbook", Altera, www.altera.com, MII5V1-3.3, 2009, pp. 1-297.

(Continued)

*Primary Examiner* — Moeen Khan
(74) *Attorney, Agent, or Firm* — Murphy, Bilak & Homiller, PLLC

(57) ABSTRACT

A method (600) for operating a constrained device is disclosed, the constrained device being operable to communicate with an entity over a network. The method, performed by the constrained device, comprises generating a message for transmission to the entity (602), encrypting the generated message by applying a Pseudo Random Binary Sequence (PRBS) to the generated message (604), and transmitting the encrypted message to the entity (606). Also disclosed is a method (700) for operating an entity comprising receiving an encrypted message from a constrained device (702) and decrypting the encrypted message by applying a PRBS to the encrypted message. In some examples of the present disclosure, a constrained device and entity may dynamically renew the PRBS used for encryption and decryption of exchanged messages.

20 Claims, 16 Drawing Sheets

(56) References Cited

U.S. PATENT DOCUMENTS

| | | | | |
|---|---|---|---|---|
| 2011/0134905 | A1* | 6/2011 | Wang | H04L 25/03866 370/345 |
| 2016/0301695 | A1* | 10/2016 | Trivelpiece | H04W 12/04 |
| 2019/0052711 | A1* | 2/2019 | Kharlanau | H04L 67/1061 |

OTHER PUBLICATIONS

Bormann, C., et al., "Terminology for Constrained-Node Networks", Internet Engineering Task Force (IETF), Request for Comments: 7228, May 2014, pp. 1-17.

Stahnke, Wayne, "Primitive Binary Polynomials", Mathematics of Computation, vol. 27, No. 124, Oct. 1973, pp. 977-980.

Zivkovic, Miodrag, "A Table of Primitive Binary Polynomials", Jan. 1994, pp. 385-386.

* cited by examiner

Figures 5A, 5B:
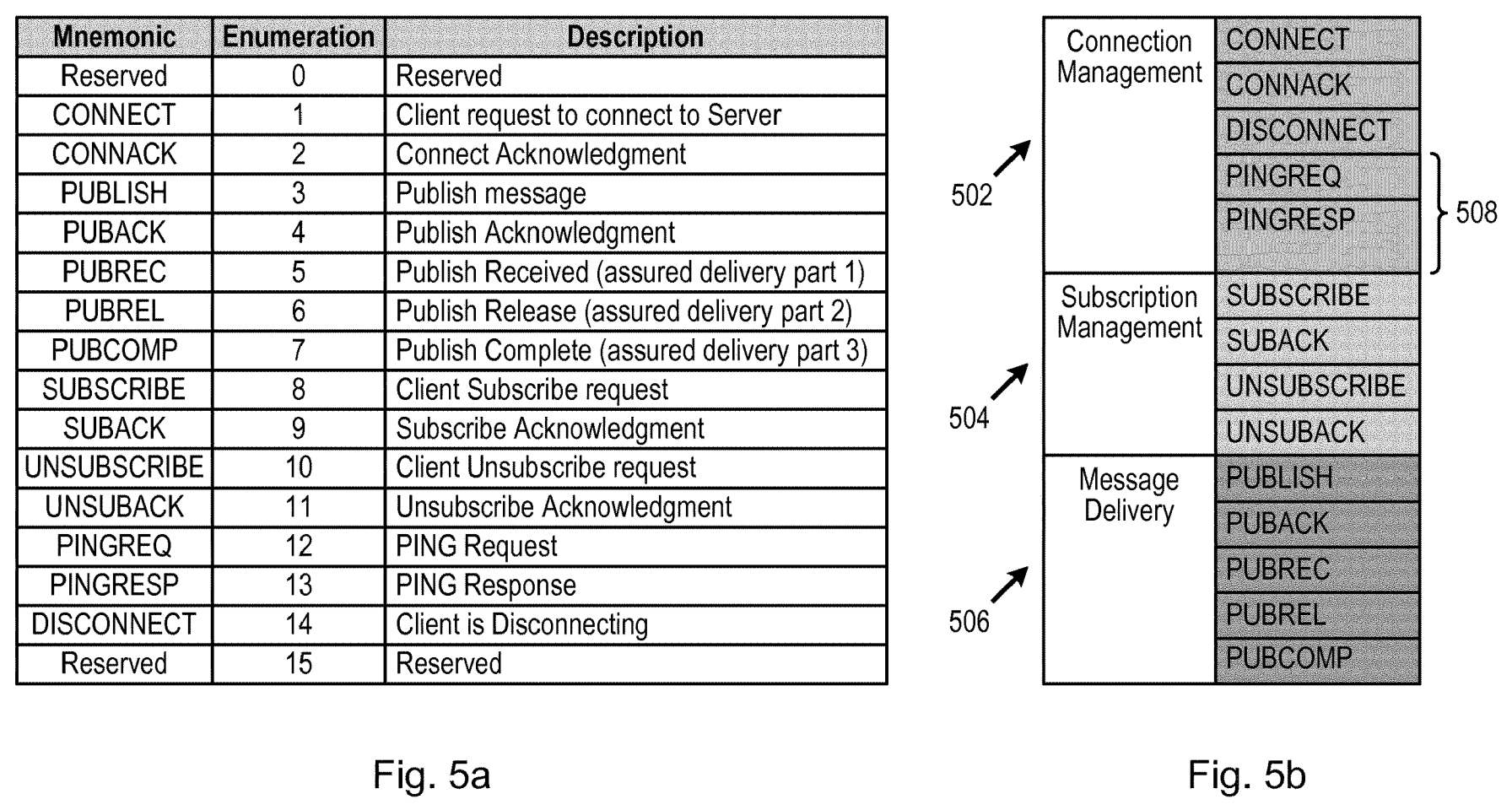

| Mnemonic | Enumeration | Description |
|---|---|---|
| Reserved | 0 | Reserved |
| CONNECT | 1 | Client request to connect to Server |
| CONNACK | 2 | Connect Acknowledgment |
| PUBLISH | 3 | Publish message |
| PUBACK | 4 | Publish Acknowledgment |
| PUBREC | 5 | Publish Received (assured delivery part 1) |
| PUBREL | 6 | Publish Release (assured delivery part 2) |
| PUBCOMP | 7 | Publish Complete (assured delivery part 3) |
| SUBSCRIBE | 8 | Client Subscribe request |
| SUBACK | 9 | Subscribe Acknowledgment |
| UNSUBSCRIBE | 10 | Client Unsubscribe request |
| UNSUBACK | 11 | Unsubscribe Acknowledgment |
| PINGREQ | 12 | PING Request |
| PINGRESP | 13 | PING Response |
| DISCONNECT | 14 | Client is Disconnecting |
| Reserved | 15 | Reserved |

Decrypt the encrypted message by applying a PRBS to the encrypted message

704

| *k* / *n* | 3 | 5 | | | 7 |
|---|---|---|---|---|---|
| 2 | 1 | | | | |
| 3 | 1 | | | | |
| 4 | 1 | | | | |
| 5 | 2 | 1 | 2 | 3 | |
| 6 | 1 | 1 | 4 | 5 | |
| 7 | 1 | 2 | 3 | 4 | |
| 8 | | 1 | 2 | 7 | |
| 9 | 4 | 3 | 5 | 6 | |
| 10 | 3 | 2 | 3 | 8 | |
| 11 | 2 | 1 | 8 | 10 | |
| 12 | | 1 | 2 | 10 | |
| 13 | | 3 | 5 | 8 | |
| 14 | | 1 | 11 | 12 | |
| 15 | 1 | 3 | 4 | 12 | |
| 16 | | 10 | 12 | 15 | |
| 17 | 3 | 4 | 12 | 16 | |
| 18 | 7 | 4 | 11 | 16 | |
| 19 | | 3 | 9 | 10 | |
| 20 | 3 | 2 | 7 | 13 | |
| 21 | 2 | 3 | 4 | 9 | |
| 22 | 1 | 3 | 7 | 12 | |
| 23 | 5 | 4 | 8 | 15 | |
| 24 | | 2 | 5 | 11 | |
| 25 | 3 | 7 | 12 | 13 | |
| 26 | | 13 | 15 | 23 | |

Fig. 11

| C:\WorkDir\Lavoro\Scrambler>java scrambler | | | | | |
|---|---|---|---|---|---|
| input = | 0 | scram_input = | 1 | output = | 0 |
| input = | 1 | scram_input = | 0 | output = | 1 |
| input = | 0 | scram_input = | 1 | output = | 1 |
| input = | 1 | scram_input = | 0 | output = | 0 |
| input = | 0 | scram_input = | 1 | output = | 1 |
| input = | 1 | scram_input = | 1 | output = | 1 |
| input = | 0 | scram_input = | 0 | output = | 0 |
| input = | 1 | scram_input = | 0 | output = | 1 |
| input = | 0 | scram_input = | 1 | output = | 0 |
| input = | 1 | scram_input = | 1 | output = | 1 |
| input = | 0 | scram_input = | 1 | output = | 0 |
| input = | 1 | scram_input = | 0 | output = | 1 |
| input = | 0 | scram_input = | 0 | output = | 0 |
| input = | 1 | scram_input = | 0 | output = | 1 |
| input = | 0 | scram_input = | 0 | output = | 0 |
| input = | 1 | scram_input = | 1 | output = | 1 |
| input = | 0 | scram_input = | 0 | output = | 0 |
| input = | 1 | scram_input = | 1 | output = | 1 |
| input = | 0 | scram_input = | 1 | output = | 0 |
| input = | 1 | scram_input = | 1 | output = | 1 |
| input = | 0 | scram_input = | 1 | output = | 0 |
| input = | 1 | scram_input = | 1 | output = | 1 |
| input = | 0 | scram_input = | 1 | output = | 0 |
| input = | 1 | scram_input = | 0 | output = | 1 |
| input = | 0 | scram_input = | 1 | output = | 0 |
| input = | 1 | scram_input = | 1 | output = | 1 |
| input = | 0 | scram_input = | 1 | output = | 0 |
| input = | 1 | scram_input = | 0 | output = | 1 |
| input = | 0 | scram_input = | 0 | output = | 0 |
| input = | 1 | scram_input = | 1 | output = | 1 |
| input = | 0 | scram_input = | 0 | output = | 0 |
| input = | 1 | scram_input = | 0 | output = | 1 |
| input = | 0 | scram_input = | 1 | output = | 0 |
| input = | 1 | scram_input = | 0 | output = | 1 |
| input = | 0 | scram_input = | 1 | output = | 0 |
| input = | 1 | scram_input = | 0 | output = | 1 |

Fig. 18

METHODS AND APPARATUS FOR OPERATING A CONSTRAINED DEVICE

TECHNICAL FIELD

The present disclosure relates to a method for operating a constrained device that is operable to communicate with an entity over a network, and to a method for operating an entity that is operable to cooperate with a constrained device over a network. The present disclosure also relates to a device, to an entity and to a computer program and a computer program product configured, when run on a computer to carry out methods performed in a device and an entity.

BACKGROUND

The "Internet of Things" (IoT) refers to devices enabled for communication network connectivity, so that these devices may be remotely managed, and data collected or required by the devices may be exchanged between individual devices and between devices and application servers. Such devices, examples of which may include sensors and actuators, are often, although not necessarily, subject to severe limitations on processing power, storage capacity, energy supply, device complexity and/or network connectivity, imposed by their operating environment or situation, and may consequently be referred to as constrained devices. Constrained devices often connect to the core network via gateways using short range radio technologies. Information collected from the constrained devices may then be used to create value in cloud environments.

The constrained nature of IoT devices has prompted the design and implementation of new protocols and mechanisms. Message Queuing Telemetry Transport (MQTT) is one example of a protocol that is widely used for IoT applications in constrained nodes and constrained networks. MQTT is an open source publish/subscribe messaging protocol that was designed in 1999 for uses related to satellites communications. MQTT is consequently very lightweight with low bandwidth requirements, making it ideal for IoT applications, and it has become one of the most common protocols in use for IoT. In addition to being very lightweight, with client implementations of the order of 2 Kb, MQTT offers easy to use APIs and is available free of charge under the Eclipse Public License (EPL).

In order to keep MQTT as lightweight as possible for resource-constrained IoT devices, MQTT does not propose any security measures on top of the Transmission Control Protocol (TCP). The MQTT specifications simply recommend that the Transport Layer Security (TLS) protocol be used for applications that require additional levels of authentication. Consequently, MQTT communications that rely on TCP alone are unencrypted and susceptible to man-in-the middle attacks. With increasing pressures to both reduce the size of IoT devices and improve their cost effectiveness so as to facilitate massive IoT deployments, even the TCP protocol has begun to be replaced by less expensive solutions, opening up the possibility for even lighter protocols such as MQTT-SN. The security vulnerabilities of MQTT are exacerbated in this new generation of even lighter weight communication protocols. Similar security vulnerabilities can also be found in other communication protocols used for IoT deployments, including for example the Constrained Application protocol (CoAP).

SUMMARY

As IoT protocols evolve in the direction of light and very cost-effective solutions, they are becoming increasingly vulnerable to security risks. Existing security solutions such as TLS are not always appropriate, and impose additional resource requirements which may be incompatible with constraints applicable to large scale IoT deployments. It is an aim of the present disclosure to provide a method, device, entity and computer readable medium which at least partially address one or more of these challenges.

According to a first aspect of the present disclosure, there is provided a method for operating a constrained device that is operable to communicate with an entity over a network. The method, performed by the constrained device, comprises generating a message for transmission to the entity, encrypting the generated message by applying a Pseudo Random Binary Sequence (PRBS) to the generated message, and transmitting the encrypted message to the entity.

For the purposes of the present disclosure, a constrained device comprises a device which conforms to the definition set out in section 2.1 of RFC 7228 for "constrained node".

According to the definition in RFC 7228, a constrained node is a node in which "some of the characteristics that are otherwise pretty much taken for granted for Internet nodes at the time of writing are not attainable, often due to cost constraints and/or physical constraints on characteristics such as size, weight, and available power and energy. The tight limits on power, memory, and processing resources lead to hard upper bounds on state, code space, and processing cycles, making optimization of energy and network bandwidth usage a dominating consideration in all design requirements. Also, some layer-2 services such as full connectivity and broadcast/multicast may be lacking". A constrained device according to examples of the present disclosure is thus clearly distinguished from server systems, desktop, laptop or tablet computers and powerful mobile devices such as smartphones. A constrained device may for example comprise a Machine Type Communication device, a battery powered device or any other device having the above discussed limitations. Examples of constrained devices may include sensors measuring temperature, humidity and gas content, for example within a room or while goods are transported and stored; motion sensors for controlling light bulbs; sensors measuring light that can be used to control shutters; heart rate monitors and other sensors for personal health (continuous monitoring of blood pressure etc.); and actuators including for example connected electronic door locks. A constrained network correspondingly comprises "a network where some of the characteristics pretty much taken for granted with link layers in common use in the Internet at the time of writing are not attainable", and more generally, may comprise a network comprising one or more constrained devices as defined above.

According to examples of the present disclosure, the entity may be a physical or a virtual entity including for example a server, a router, a virtualised network function hosted on a server or other equipment etc. According to examples of the present disclosure, the entity may comprise an MQTT broker.

According to examples of the present disclosure, applying a PRBS to the generated message may comprise adding the PRBS to the generated message using modulo-2 addition.

According to examples of the present disclosure, applying a PRBS to the generated message may comprise inputting the generated message to a Linear Feedback Shift Register (LFSR).

According to examples of the present disclosure, the LFSR may be implemented on a Programmable Logic Device such as a Complex Programmable Logic Device (CPLD) or a Field Programmable Gate Array (FPGA), which may be comprised within, connected to, or in communication with the device. According to further examples of the present disclosure, the LFSR may be implemented in software.

According to examples of the present disclosure, a characteristic polynomial of the LFSR may comprise a Primitive Binary Polynomial. According to examples of the present disclosure, the characteristic polynomial of the LFSR may define tap positions of the LFSR, with a tap present at a position of the LFSR if a variable with an exponent corresponding to that position is present in the polynomial. According to examples of the present disclosure, Primitive Binary Trinomials may be used as characteristic polynomials of the LFSR.

According to examples of the present disclosure, the method may further comprise configuring the LFSR in accordance with a characteristic polynomial.

According to examples of the present disclosure, the characteristic polynomial may be a default polynomial.

According to examples of the present disclosure, the default characteristic polynomial may be programmed into the device at manufacture or on deployment into the field.

According to examples of the present disclosure, the method may further comprise, on expiry of an encryption renewal trigger, configuring the LFSR in accordance with a different characteristic polynomial.

According to examples of the present disclosure, the encryption renewal trigger may comprise at least one of sending or receiving a periodic message for the purpose of maintaining a connection with the entity.

According to examples of the present disclosure, the periodic message may be a Keep Alive message, a Heartbeat message or any other periodic message for the purpose of maintaining a connection between the device and the entity. According to examples of the present disclosure, the trigger may comprise at least one of the sending or receiving of a threshold number of periodic messages since configuring of the LFSR with the current characteristic polynomial. According to examples of the present disclosure, other examples of trigger may be envisaged, such as a timer, for example based on a system clock signal, or another event based trigger.

According to examples of the present disclosure, the method may further comprise obtaining the different characteristic polynomial in accordance with a rule. According to examples of the present disclosure, the rule may comprise a procedure for selecting a polynomial from a set of candidate polynomials.

According to examples of the present disclosure, the set may be programmed into a memory of the device, for example at manufacture or on deployment into the field. The set may comprise Primitive Binary Polynomials and may in some examples comprise Primitive Binary Trinomials.

According to examples of the present disclosure, the procedure may comprise an ordered cyclical progression through the set of candidate polynomials. According to examples of the present disclosure, the progression may be "ordered" in the sense that the set of candidate polynomials is ordered and the progression through the set follows this order. According to other examples of the present disclosure, the set of candidate polynomials may not be ordered, and the procedure may specify an order in which the constrained device should progress through the candidate polynomials of the set. According to examples of the present disclosure, the progression may be cyclical in that, on reaching the last candidate polynomial in the set according to the ordered progression, the progression restarts with the first candidate polynomial in the ordered progression.

According to examples of the present disclosure, obtaining the different polynomial may comprise selecting from the set the next polynomial in the ordered cyclical progression.

According to examples of the present disclosure, obtaining the different polynomial may comprise calculating a function of a previous message and selecting from the set a polynomial that is determined by the calculated result of the function.

According to examples of the present disclosure, obtaining the different polynomial may comprise calculating a function of a previous message and selecting from the set a polynomial that is a number of polynomials after the currently programmed characteristic polynomial, the number comprising the calculated result of the function. According to examples of the present disclosure, a polynomial that is a number of polynomials after the currently programmed polynomial may comprise a polynomial that is the number of polynomials after the currently programmed polynomial according to the ordered progression.

According to further examples of the present disclosure, the set may be indexed by number, and the procedure may comprise selecting from the set a polynomial that has an index number corresponding to the calculated result of the function. According to examples of the present disclosure, the function of the previous message may comprise addition of the 1s present in a binary message, a hash function of the message etc.

According to examples of the present disclosure, other selection procedures may be envisaged, such as a random selection from the set by the constrained device.

According to examples of the present disclosure, the method may further comprise informing the entity of the previous message on which the selection of a different characteristic polynomial is based. According to examples of the present disclosure, the entity may be informed in a dedicated message, which may for example be repeated multiple times allowing for a majority criterion to be used by the entity, so addressing the risk of individual bit error.

According to examples of the present disclosure, the method may further comprise informing the entity of the different characteristic polynomial.

According to examples of the present disclosure, informing the entity of the different characteristic polynomial may comprise communicating the selected polynomial to the entity in a dedicated message or as part of another message.

According to examples of the present disclosure, the method may further comprise receiving an encryption reset message from the entity and configuring the LFSR in accordance with a default characteristic polynomial.

According to examples of the present disclosure, the method may further comprise receiving an encrypted message from the entity and decrypting the encrypted message by applying a PRBS to the encrypted message.

According to examples of the present disclosure, decrypting the encrypted message may comprise applying the same PRBS to the encrypted message as is applied to encrypt a generated message.

According to examples of the present disclosure, the method may further comprise applying the PRBS to the decrypted message to generate a check message and generating an error signal representing a comparison between the check message and the received encrypted message.

According to examples of the present disclosure, the method may further comprise, if the error signal exceeds a threshold, sending an encryption reset message to the entity.

According to examples of the present disclosure, the method may further comprise configuring the LFSR in accordance with a default characteristic polynomial.

According to examples of the present disclosure, the constrained device may be an M2M, MTC or IoT device, and the entity may be a broker such as an MQTT broker, CoAP client or any other entity operable to communicate with the constrained device. Messages exchanged may be MQTT messages, DDS messages, CoAP messages or AMQP messages.

According to another aspect of the present disclosure, there is provided a method for operating an entity that is operable to cooperate with a constrained device over a network. The method, performed by the entity, comprises receiving an encrypted message from the constrained device and decrypting the encrypted message by applying a Pseudo Random Binary Sequence (PRBS) to the encrypted message.

According to examples of the present disclosure, the method may further comprise performing one or more processing steps on the basis of the decrypted message. The entity may be a physical or a virtual entity including for example a server, a router a virtualised network function hosted on a server or other equipment etc. According to examples of the present disclosure, the entity may comprise an MQTT broker.

According to examples of the present disclosure, applying a PRBS to the encrypted message may comprise adding the PRBS to the encrypted message using modulo-2 addition.

According to examples of the present disclosure, applying a PRBS to the encrypted message may comprise inputting the encrypted message to a Linear Feedback Shift Register (LFSR).

According to examples of the present disclosure, the LFSR may be implemented on a Programmable Logic Device such as a Complex Programmable Logic Device (CPLD) or a Field Programmable Gate Array (FPGA), which may be comprised within, connected to, or in communication with the entity.

According to examples of the present disclosure, a characteristic polynomial of the LFSR may comprise a Primitive Binary Polynomial. According to examples of the present disclosure, the characteristic polynomial of the LFSR may define tap positions of the LFSR, with a tap present at a position of the LFSR if a variable with an exponent corresponding to that position is present in the polynomial. According to examples of the present disclosure, Primitive Binary Trinomials may be used as characteristic polynomials of the LFSR.

According to examples of the present disclosure, the method may comprise configuring the LFSR in accordance with a characteristic polynomial.

According to examples of the present disclosure, the characteristic polynomial may be a default polynomial.

According to examples of the present disclosure, the default characteristic polynomial may be programmed into the entity at manufacture or on deployment into the field.

According to examples of the present disclosure, the method may further comprise, on expiry of an encryption renewal trigger, configuring the LFSR in accordance with a different characteristic polynomial.

According to examples of the present disclosure, the encryption renewal trigger may comprise at least one of sending or receiving a periodic message for the purpose of maintaining a connection with the constrained device.

According to examples of the present disclosure, the periodic message may be a Keep Alive message, a Heartbeat message or any other periodic message for the purpose of maintaining a connection between the device and the entity. According to examples of the present disclosure, the trigger may comprise at least one of the sending or receiving of a threshold number of periodic messages since configuring of the LFSR with the current characteristic polynomial. According to examples of the present disclosure, other examples of trigger may be envisaged, such as a timer, for example based on a system clock signal, or another event based trigger.

According to examples of the present disclosure, the method may further comprise obtaining the different characteristic polynomial in accordance with a rule.

According to examples of the present disclosure, the rule may comprise a procedure for selecting a polynomial from a set of candidate polynomials.

According to examples of the present disclosure, the set may be programmed into a memory of the entity, for example at manufacture or on deployment into the field. The set may comprise Primitive binary polynomials and may in some examples comprise Primitive Binary Trinomials.

According to examples of the present disclosure, the procedure may comprise an ordered cyclical progression through the set of candidate polynomials. According to examples of the present disclosure, the progression may be "ordered" in the sense that the set of candidate polynomials is ordered and the progression through the set follows this order. According to other examples of the present disclosure, the set of candidate polynomials may not be ordered, and the procedure may specify an order in which the constrained device should progress through the candidate polynomials of the set. According to examples of the present disclosure, the progression may be cyclical in that, on reaching the last candidate polynomial in the set according to the ordered progression, the progression restarts with the first candidate polynomial in the ordered progression.

According to examples of the present disclosure, obtaining the different polynomial may comprise selecting from the set the next polynomial in the ordered cyclical progression.

According to examples of the present disclosure, obtaining the different polynomial may comprise calculating a function of a previous message and selecting from the set a polynomial that is determined by the calculated result of the function.

According to examples of the present disclosure, obtaining the different polynomial may comprise calculating a function of a previous message and selecting from the set a polynomial that is a number of polynomials after the currently programmed characteristic polynomial, the number comprising the calculated result of the function. According to examples of the present disclosure, a polynomial that is a number of polynomials after the currently programmed polynomial may comprise a polynomial that is the number of polynomials after the currently programmed polynomial according to the ordered progression.

According to further examples of the present disclosure, the set may be indexed by number, and the procedure may comprise selecting from the set a polynomial that has an index number corresponding to the calculated result of the function. According to examples of the present disclosure, the function may comprise addition of the 1s present in a binary message, a hash function of the message etc.

According to examples of the present disclosure, other selection procedures may be envisaged, such as a random selection from the set by the entity.

According to examples of the present disclosure, the method may further comprise receiving from the constrained device an instruction indicating the previous message on which the selection of a different characteristic polynomial is to be based.

According to examples of the present disclosure, the instruction may be received in a dedicated message, which may for example be repeated multiple times. The method may further comprise using a majority criterion to select the instruction to be retained in the event of a difference between instructions received, so addressing the risk of individual bit error.

According to examples of the present disclosure, the method may further comprise receiving the different characteristic polynomial from the constrained device. According to examples of the present disclosure, this may comprise receiving the different polynomial in a dedicated message or as part of another message.

According to examples of the present disclosure, the method may further comprise applying the PRBS to the decrypted message to generate a check message and generating an error signal representing a comparison between the check message and the received encrypted message.

According to examples of the present disclosure, the method may further comprise, if the error signal exceeds a threshold, sending an encryption reset message to the constrained device.

According to examples of the present disclosure, the threshold may comprise a value for the error signal or a count of a number of times that the error signal toggles between signalling normal operation and signalling an error.

According to examples of the present disclosure, the method may further comprise configuring the LFSR in accordance with a default characteristic polynomial.

According to examples of the present disclosure, the method may further comprise generating a message for transmission to the constrained device, encrypting the generated message by applying a Pseudo Random Binary Sequence, PRBS, to the generated message, and transmitting the encrypted message to the constrained device.

According to examples of the present disclosure, encrypting the generated message may comprise applying the same PRBS to the generated message as is applied to decrypt a received message.

According to examples of the present disclosure, the constrained device may be an M2M, MTC or IoT device, and the entity may be a broker such as an MQTT broker, CoAP client or any other entity operable to cooperate with the constrained device.

Messages exchanged may be MQTT messages, DDS messages, CoAP messages or AMQP messages.

According to another aspect of the present disclosure, there is provided a computer program comprising instructions which, when executed on at least one processor, cause the at least one processor to carry out a method according to any one of the preceding aspects or examples of the present disclosure.

According to another aspect of the present disclosure, there is provided a carrier containing a computer program according to the preceding aspect of the present disclosure, wherein the carrier comprises one of an electronic signal, optical signal, radio signal or computer readable storage medium.

According to another aspect of the present disclosure, there is provided a computer program product comprising non transitory computer readable media having stored thereon a computer program according to a preceding aspect of the present disclosure.

According to another aspect of the present disclosure, there is provided a constrained device that is operable to communicate with an entity over a network. The constrained device comprises a processor and a memory, the memory containing instructions executable by the processor such that the constrained device is operable to generate a message for transmission to the entity, encrypt the generated message by applying a PRBS to the generated message, and transmit the encrypted message to the entity.

According to examples of the present disclosure, the constrained device may be further operable to carry out a method according to any one of the preceding aspects or examples of the present disclosure.

According to another aspect of the present disclosure, there is provided a constrained device that is operable to communicate with an entity over a network. The constrained device is adapted to generate a message for transmission to the entity, encrypt the generated message by applying a PRBS to the generated message, and transmit the encrypted message to the entity.

According to examples of the present disclosure, the constrained device may be further adapted to carry out a method according to any one of the preceding aspects or examples of the present disclosure.

According to another aspect of the present disclosure, there is provided an entity that is operable to cooperate with a constrained device over a network. The entity comprises a processor and a memory, the memory containing instructions executable by the processor such that the entity is operable to receive an encrypted message from the constrained device, and decrypt the encrypted message by applying a PRBS to the encrypted message.

According to examples of the present disclosure, the entity may be further operable to carry out a method according to any one of the preceding aspects or examples of the present disclosure.

According to another aspect of the present disclosure, there is provided an entity that is operable to cooperate with a constrained device over a network. The entity is adapted to receive an encrypted message from the constrained device, and decrypt the encrypted message by applying a PRBS to the encrypted message.

According to examples of the present disclosure, the entity may be further operable to carry out a method according to any one of the preceding aspects or examples of the present disclosure.

BRIEF DESCRIPTION OF THE DRAWINGS

For a better understanding of the present disclosure, and to show more clearly how it may be carried into effect, reference will now be made, by way of example, to the following drawings, in which:

FIG. 5*a* illustrates different MQTT message packet types, and FIG. 5*b* illustrates the MQTT API flows within which these message types are exchanged;

FIG. 6 is a flow chart illustrating process steps in a method for operating a constrained device;

FIG. 11 is an extract of a table of Primitive Binary Polynomials;

FIG. 18 is a table illustrating results of an encryption simulation.

DETAILED DESCRIPTION

Aspects of the present disclosure provide methods for operation of a constrained device and an entity, according to which a message generated by the constrained device for transmission over a network to the entity is encrypted by the constrained device before transmission. The encryption is performed by applying a Pseudo Random Binary Sequence (PRBS) to the generated message. Examples of the present disclosure may be incorporated into any messaging protocol used by a constrained device and/or entity for communication. In the following detailed description, the example of MQTT is used to demonstrate implementation of examples of the present disclosure. A discussion of some of the features of MQTT, together with a more detailed examination of its security vulnerabilities, follows below for the purpose of providing additional context to the subsequent detailed description of methods and apparatus according to the present disclosure.

MQTT was developed in 1999 for the monitoring of an oil pipeline through the desert, with the intention of providing a protocol that was highly efficient, both in terms of bandwidth usage and power requirements. The characteristics of MQTT, including its API simplicity, lightness, and cost-effectiveness, have resulted in widespread use of the protocol in a range of technological fields. Example use cases for MQTT include automotive (connected cars), healthcare (medical devices and home monitoring), transport and supply chain (asset tracking, ticketing), oil and gas (pipeline management), energies and utilities (smart metering and demand management), manufacturing (process control), finance (customer alerting), telecoms (IoT and M2M services) and Mobile applications.

MQTT uses a publish/subscribe architecture, in contrast to HTTP with its request/response paradigm. The publish/subscribe architecture is event-driven, with messages pushed to clients on the basis of subscription by clients to particular topics. The central communication point for MQTT is the MQTT broker, which is responsible for dispatching messages between senders and rightful receivers. Each client that publishes a message to the MQTT broker includes a topic in the message, which topic serves as the routing information used by the MQTT broker for that message. Each client that wishes to receive messages subscribes to one or more relevant topics, and on receipt of a message, the MQTT broker forwards the message to all clients that have subscribed to the topic included with the message. Clients will thus receive all messages relating to topics to which they have subscribed. The publish/subscribe architecture of MQTT ensures that clients do not have to know each other in order to communicate, as all communication is conducted on the basis of topics via the MQTT broker. This architecture enables highly scalable solutions without dependencies between data producers and data consumers.

Figure 1:
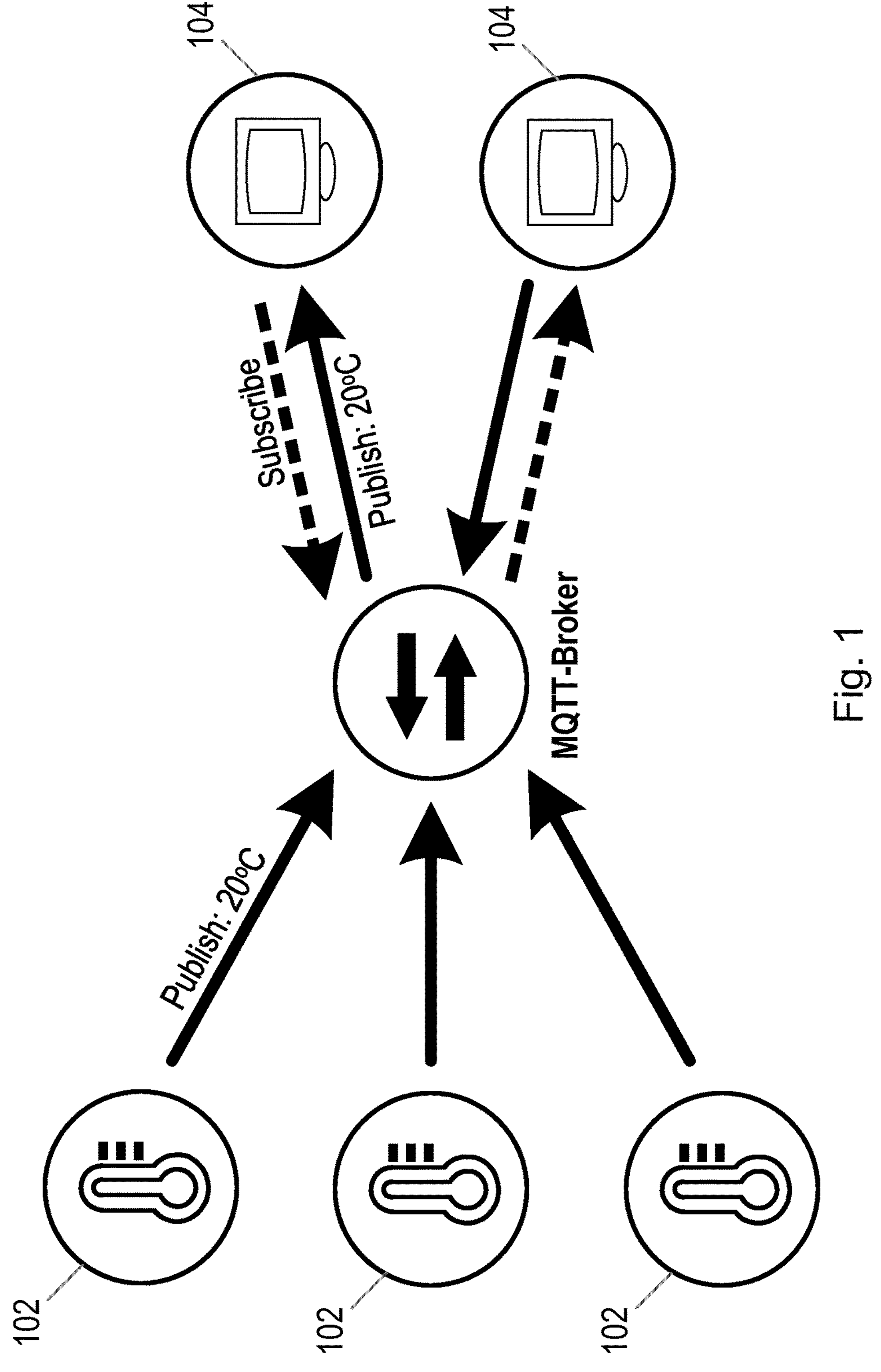
FIG. 1 illustrates a simple IoT deployment.

FIG. 1 illustrates a simple IoT deployment including temperature sensors 102, servers 104 and an MQTT broker 106. The temperature sensors 102 publish sensed temperature readings to the broker 106 with an appropriate topic. A server 104 wishing to receive temperature updates subscribes to a topic for which the server requires updates. On receiving a message with a particular topic, the MQTT broker 106 forwards that message to all servers 104 that have subscribed to the topic.

Figure 2:
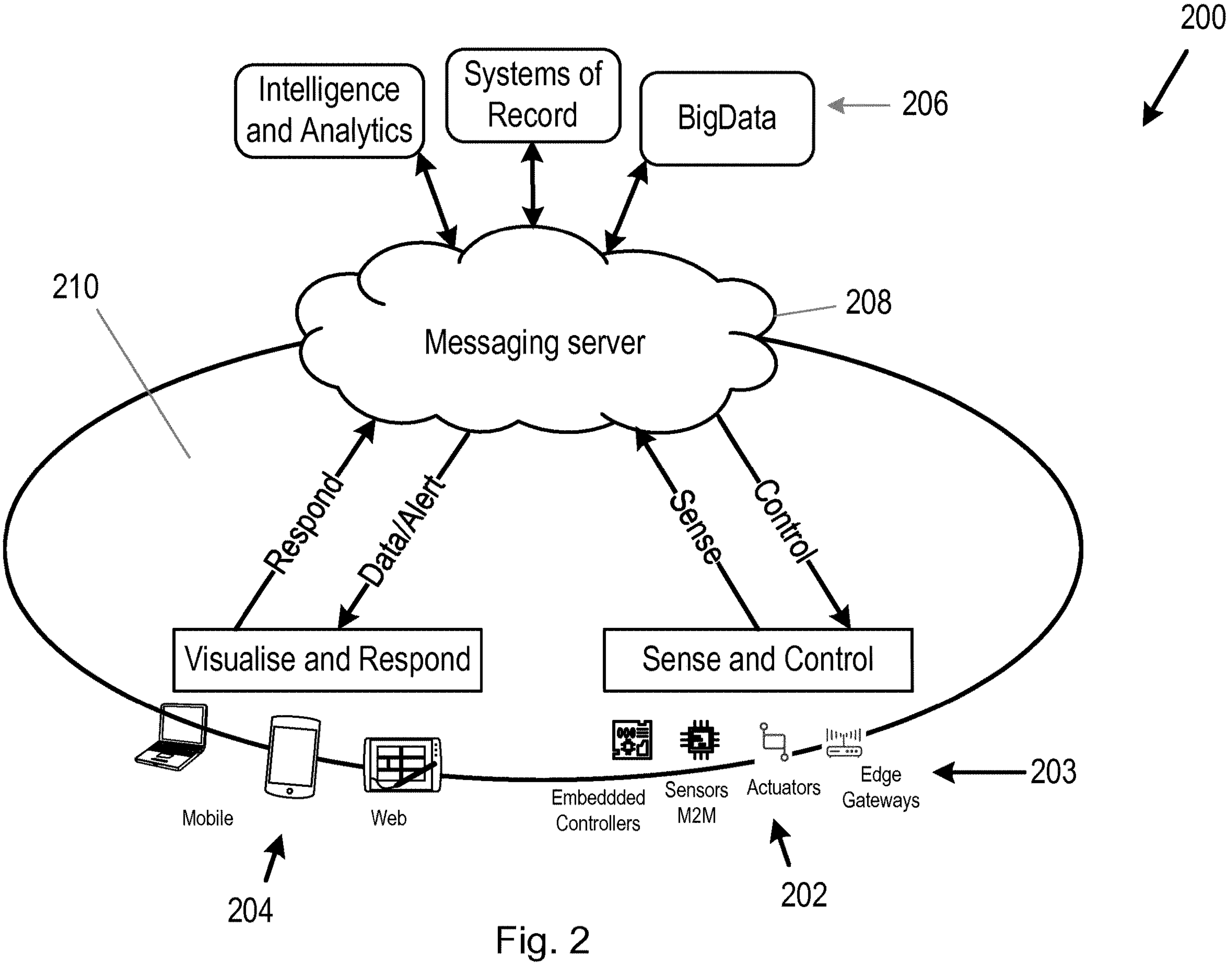
FIG. 2 illustrates incorporation of the MQTT protocol into a deployment architecture.

FIG. 2 provides an overview of how the MQTT protocol may be incorporated into a generalised sense and control deployment architecture. The deployment architecture 200 illustrated in FIG. 2 includes Machine to Machine (M2M) devices 202 such as embedded controllers, sensors and actuators, and edge gateways 203. Edge gateways 203 may be used for communication with M2M devices that cannot connect directly to a core network, and instead communicate with an edge gateway 203 via short range radio. The deployment architecture 200 additionally comprises mobile and web based applications and devices 204, large scale analytics and storage functions 206 and a central messaging server 208, within which an MQTT broker is realised. The messaging server receives sensor information from the M2M devices 202 and edge gateways 203, and relays control information back to these devices and gateways. The messaging server additionally communicates sensing and or alert data received from the devices 202 and gateways 203 to the mobile and web applications 204, and relays responses from the applications 204 back to the M2M devices 202 and gateways 203. The messaging server 208 also exchanges information with analytics and storage functions 206. As illustrated by the shaded area 210, MQTT may be used for bidirectional topic based communication enabling the exchange of sense and control data with the M2M devices 202 and edge gateways 203, and the exchange of visualisation and response data with the mobile and web based applications and devices 204.

Figures 3, 4:
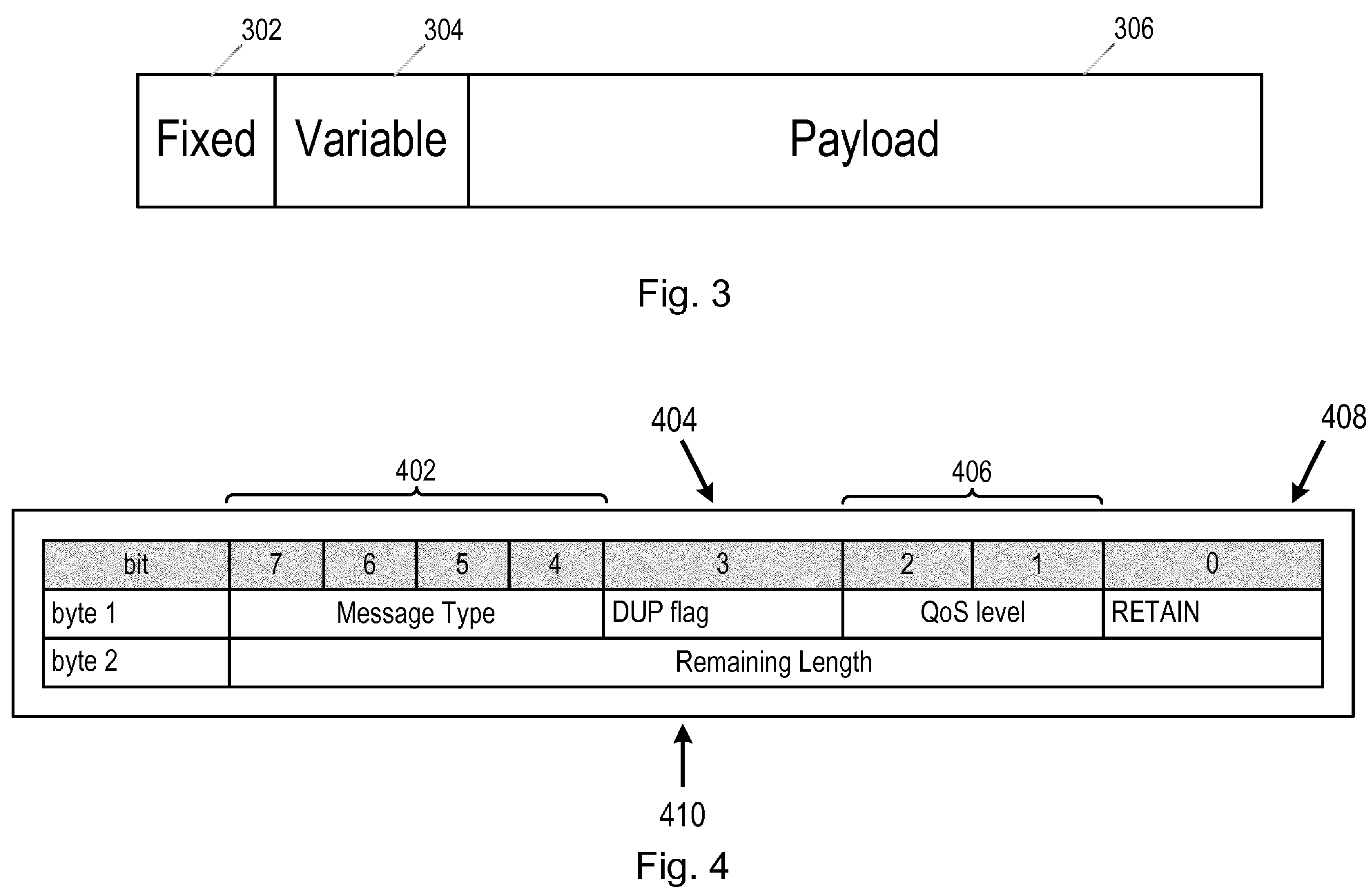
FIG. 3 is a schematic illustration of the message fields which may be included in an MQTT message.
FIG. 4 illustrates an MQTT fixed header for a publish message.

FIG. 3 is a schematic illustration of the message fields which may be included in an MQTT message, including a Fixed header 302 of length 2 bytes, an optional Variable header 304 of variable length, and a message Payload 306 which is also optional and of length up to 256 MB. FIG. 4 illustrates in greater detail an MQTT fixed header for a publish message. Referring to FIG. 4, the first byte of the fixed header includes four bits 402 indicating the Message type of the message and a DUP flag bit 404 which, if set, indicates that the message is a duplicate of an earlier message, which may not have been acknowledged. The first byte of the fixed header also includes 2 bits 406 indicating the Quality of Service (QoS) level of the message and a final RETAIN flag bit 408 which determines whether the message is saved by the broker as the last known value for that message topic. The second byte 410 of the fixed header is used to encode the remaining length of the message including data in the variable header and the payload. The contents of the Variable header 304 depend on the Message Packet Type and may include Message ID, Topic name etc.

FIG. 5*a* illustrates different MQTT message packet types, and FIG. 5*b* illustrates the MQTT API flows within which these message types are exchanged. It will be appreciated that most flows include both an initial message and a corresponding acknowledgement. Referring to FIGS. 5*a* and 5*b*, Connection Management API flows 502 may initiate a new session or restart a previous session, and may include specification of a "Last Will and Testament" message and topic. Connection Management flows 502 may also include KeepAlive messages, as discussed in further detail below. Subscription Management API flows 504 allow for subscription to one or more topics. Message Delivery API flows 506 may be sent from client to server to publish information, or from server to client to send messages. Messages exchanged in Message delivery API flows may depend upon an assigned QoS level. As mentioned above, the MQTT protocol includes support for KeepAlive messages, enabling client and server to detect failed connections. At connection time, a keep alive can be specified such that, if client does not send a PINGREQ request to the server, the server assumes that the connection to the client has failed, and, if the client does not receive a PINGRESP within a specified KeepAlive time after sending the PINGREQ, the client assumes that the connection to the server has failed.

As discussed above, in order to keep the protocol as lightweight as possible for resource-constrained IoT and edge devices, the MQTT specification does not offer any security procedures on top of TCP other than a recommendation that the Transport Layer Security (TLS) protocol be used for applications that require additional levels of authentication. Consequently, MQTT communications that rely on TCP alone are unencrypted and susceptible to man-in-the-middle attacks, as illustrated in the following example scenario.

Considering the case of a proximity sensing platform, the MQTT protocol allows the use of a username and password for client identification, but these are displayed in text if some form of encryption isn't used. An eavesdropper could therefore impersonate a client subscriber and decrypt a message payload, or even imitate a client publisher and issue fake or modified messages. Thus for example if an M2M device publishes a message to the MQTT broker with the topic "home/occupancy" this could be used by a malicious third party to determine when a house is empty, and in a commercial deployment scenario this vulnerability could have serious implications for processes such as remote firmware updates.

The MQTT protocol does recommend the use of TLS for more sensitive MQTT implementations, and a network port (port 8883) has been reserved for this purpose. TLS is the successor to the Secure Sockets Layer (SSL) protocol, and provides an encrypted communication channel over which MQTT messages can be sent. Before the channel is established TLS uses a handshake to pass certificates (or keys) from the publisher to the broker, and also between the broker and subscribers. A disadvantage of using TLS, SSL, and similar methods of encryption is that they can add significant overhead, which MQTT is specifically designed to avoid. For example, MQTT client libraries are available (wolfMQTT) with a compiled size of 3.6 kB. A TLS handshake alone consumes this level of resources, without accounting for the encryption overhead on the individual packets themselves. For certain resource-constrained embedded devices, particularly those based on small microcontrollers, this added workload can simply consume too much in terms of CPU resources. Additionally, the cost effectiveness requirements for IoT devices are very tight. In the case of very small and high volume devices, the cost effectiveness limit is of the order of few dollars, prohibiting the use of additional specialised resources and pushing towards even lighter evolutions of MQTT that omit even TCP in order to reduce cost. MQTT-SN and CoAP are examples of very light weight protocols that omit the use of TCP.

FIG. 6 is a flow chart illustrating process steps in a method 600 according to an example of the present disclosure. The method 600 is for operating a constrained device that is operable to communicate with an entity over a network. The constrained device comprises a device conforming to the definition of "constrained node" as set out in RFC 7228 and discussed above. The entity may be a physical or virtual entity including for example a server, a router, a virtualised network function hosted on a server or other equipment etc. In some examples, the entity may be an MQTT broker. The network may comprise any communication network, including for example a 3GPP network.

Referring to FIG. 6, the method 600, performed in the constrained device, comprises in a first step 602 generating a message for transmission to the entity. In step 604, the method 600 comprises encrypting the generated message by applying a PRBS to the generated message. In step 606, the method 600 comprises transmitting the encrypted message to the entity.

Figure 7:
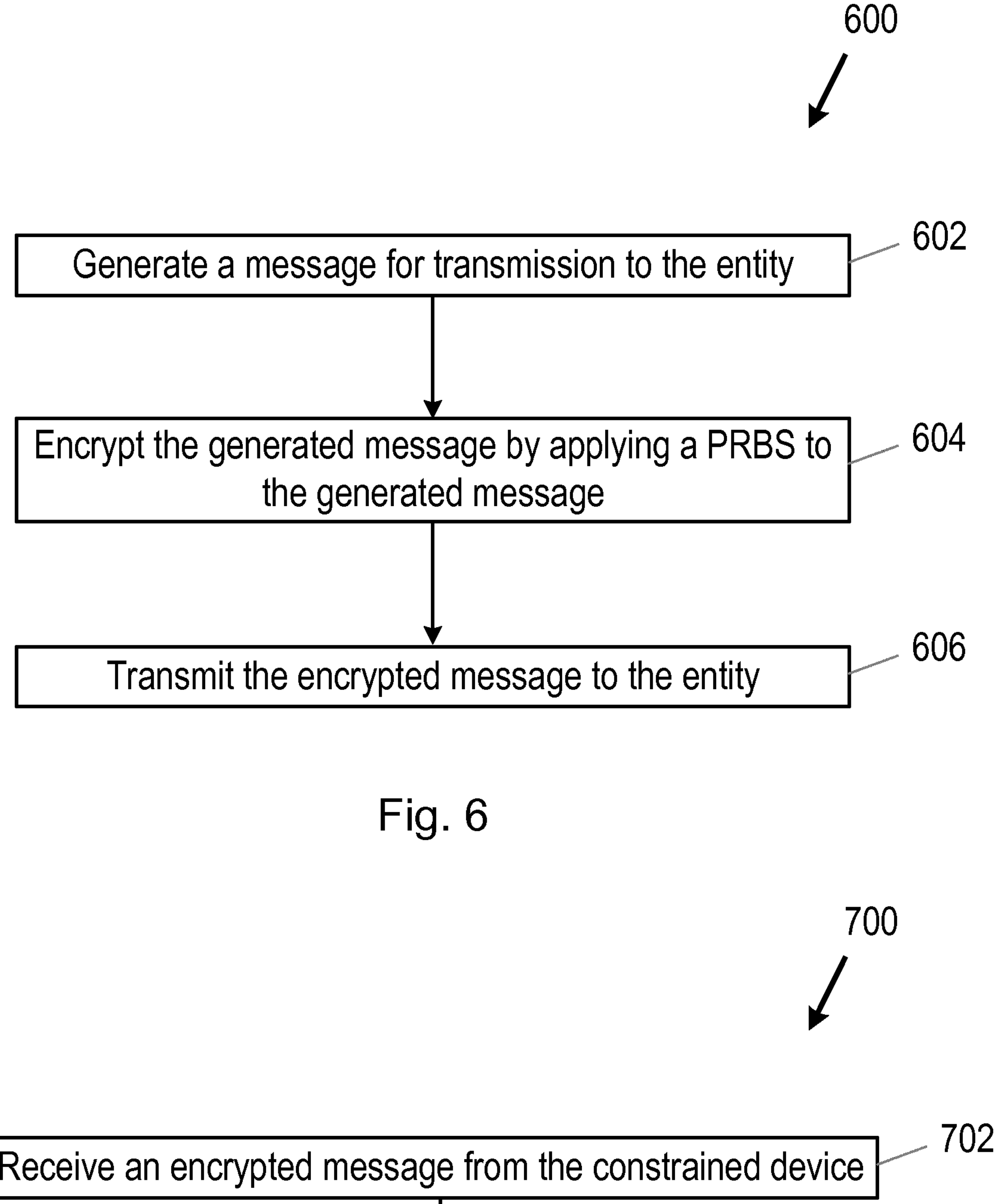
FIG. 7 is a flow chart illustrating process steps in a method for operating an entity.

FIG. 7 is a flow chart illustrating process steps in a method 700 according to another example of the present disclosure. The method 700 is for operating an entity that is operable to cooperate with a constrained device over a network. The entity performing the method may be a physical or virtual entity including for example a server, a router, a virtualised network function hosted on a server or other equipment etc. In some examples, the entity may be an MQTT broker. The method 700 compliments the method 600, facilitating communication between the constrained device and the entity. Referring to FIG. 7, the method 700, performed in the entity, comprises receiving an encrypted message from the constrained device in step 702 and, in step 704, decrypting the encrypted message by applying a PRBS to the encrypted message.

Together the methods 600 and 700 enable secure communication between a constrained device and an entity. The use of a PRBS to encrypt and decrypt a message does not impose significant additional resource requirements, respecting the constraints to which the device and entity may be subject. As discussed in greater detail below, incorporating physical components capable of performing the steps of method 600 and 700 into a constrained device and entity need not add significant cost to the manufacture of such components, so ensuring the components themselves remain cost effective while at the same time addressing security vulnerabilities inherent in communication protocols designed and developed for constrained devices and environments.

Figure 8A:
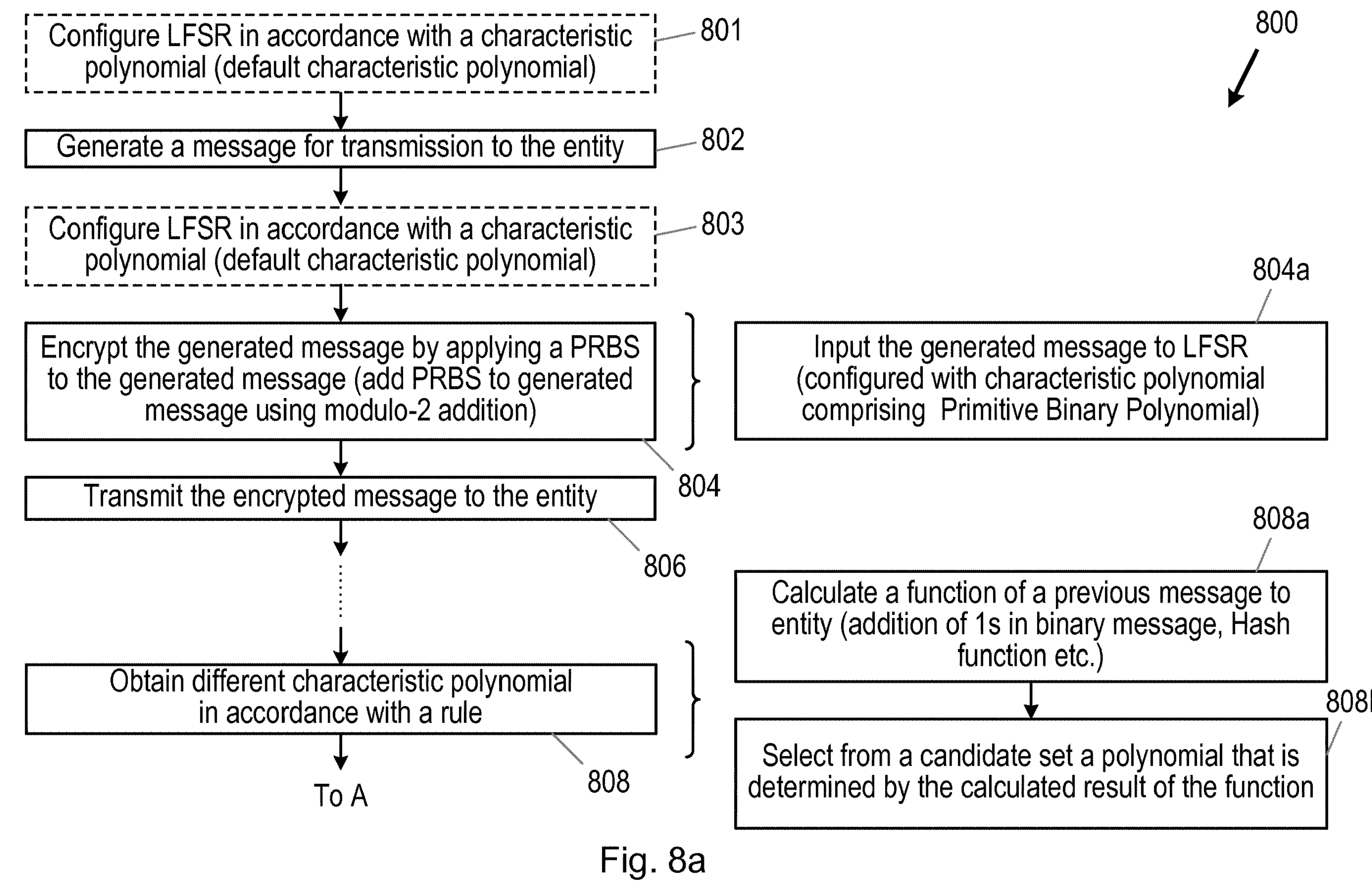
FIGS. 8*a* and 8*b* is a flow chart illustrating process steps in another example of a method for operating a constrained device.
Figure 8B:
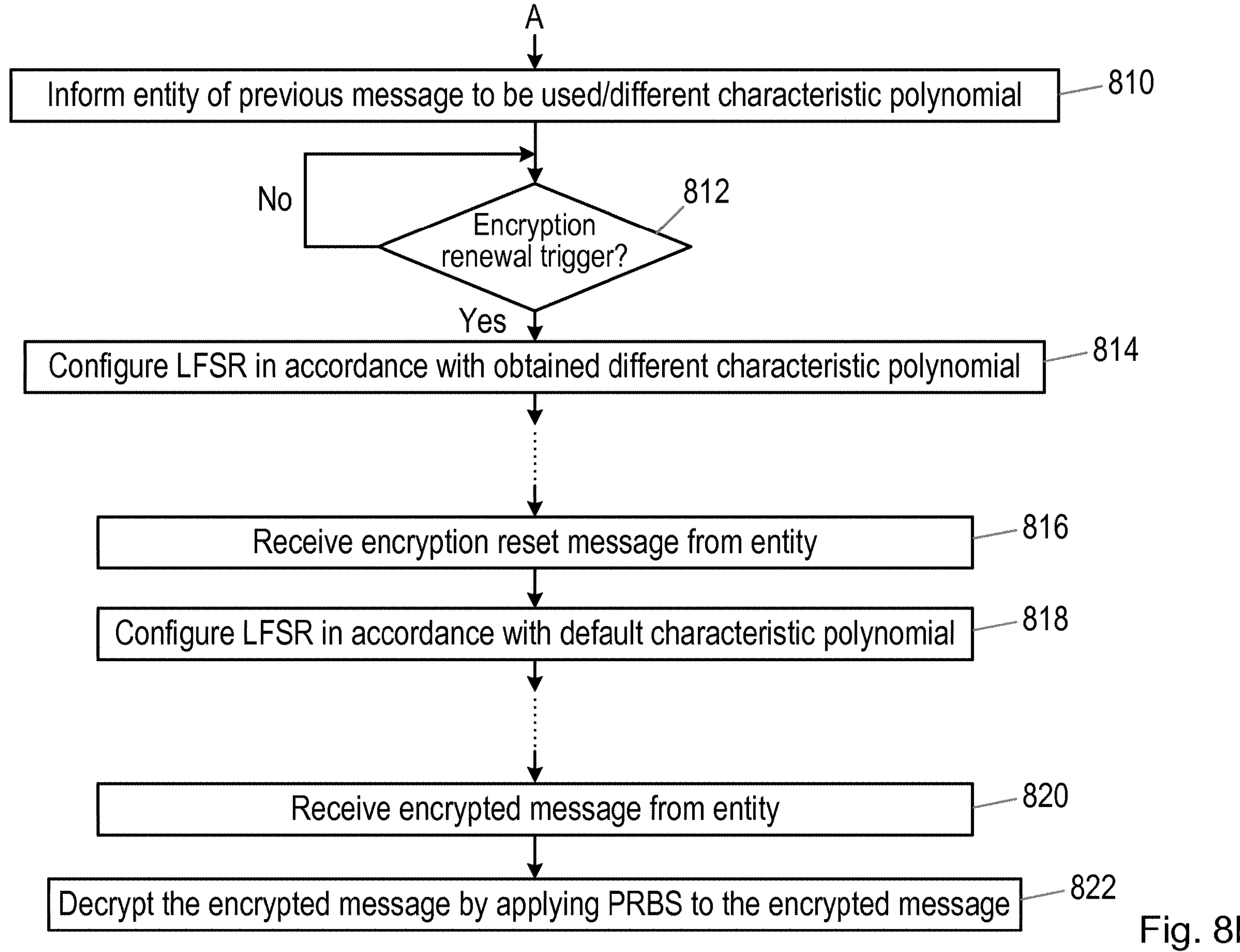

FIGS. 8*a* and 8*b* are flow charts illustrating process steps in another example of method 800 for operating a constrained device. The steps of the method 800 illustrate one way in which the steps of the method 600 may be implemented and supplemented in order to achieve the above discussed and additional functionality. As for the method 600 of FIG. 6, the constrained device conducting the method may be a constrained device as set out above. The device may be configured to communicate using any suitable communication protocol, including for example MQTT, CoAP, HTTP etc. In the example method of FIGS. 8*a* and 8*b*, it is assumed that the constrained device comprises a Linear Feedback Shift Register, implemented for example on a Programmable Logic Device such as a Complex Programmable Logic Device (CPLD) or a Field Programmable Gate Array (FPGA), which may be comprised within, connected to, or in communication with the device. In other examples, the LFSR may be implemented in software running on or accessible to the device. The entity with which the constrained device communicates may comprise a physical or a virtual entity including for example a server, a router, a virtualised network function hosted on a server or other equipment etc. According to examples of the present disclosure, the entity may comprise an MQTT broker.

Referring initially to FIG. 8*a*, the method 800 comprises the step of configuring a LFSR in accordance with a characteristic polynomial, which may for example be a default characteristic polynomial selected and configured into the constrained device at manufacture or deployment of the device. The configuring step may take place before or after a step of generating a message for transmission to an entity with which the constrained device is operable to communicate over a network. The configuring step is thus illustrated in FIG. 8*a* as either step 801, taking place before the step of generating a message, or as step 803, taking place after generating the message. The step 802 of generating a message for transmission to the entity may comprise for example generating a data message such as a publish message in MQTT or a CoAP report message or any other kind of data or control message according to any communication protocol.

In step 804, the constrained device encrypts the generated message by applying a PRBS to the generated message. The application of the PRBS comprises application using modulo-2 addition, and is achieved by inputting the generated message to the LFSR that was configured with a characteristic polynomial in step 801 or 803. As illustrated in step 804*a*, the characteristic polynomial comprises in the present example a Primitive Binary Polynomial. The characteristic polynomial of the LFSR defines the tap positions for the LFSR to implement the modulo-2 addition of a PRBS to the generated message that is input to the LFSR, with a tap present at a position in the LFSR if a variable with an exponent corresponding to that position is present in the polynomial. This is discussed in further detail below with reference to FIG. 10.

In step 806, the constrained device transmits the encrypted message to the entity. As discussed above, this transmission may be carried out according to any communication protocol that the constrained device is configured to use. The steps of generating, encrypting and transmitting messages may be repeated according to the requirements of the constrained device to provide information to the entity.

In step 808, the constrained device obtains a different characteristic polynomial according to a rule. The different characteristic polynomial may be different in that it is different to the current characteristic polynomial, in accordance with which the LFSR is currently configured. The obtaining step 808 may be prompted by an event such as the expiry of a timer, a number of messages sent to the entity, a number of periodic messages sent for the purpose of maintaining communication with the server, etc. In the illustrated example, the rule comprises a procedure for selecting a polynomial from a set of candidate polynomials. The set of candidate polynomials may for example be programmed into a memory of the device, at manufacture or on deployment into the field or at any other suitable time. The set may comprise Primitive Binary Polynomials and may in some examples comprise Primitive Binary Trinomials. In one example, the procedure for selection of a different polynomial comprises an ordered cyclical progression through the set of candidate polynomials. Obtaining the different polynomial may comprise selecting from the set the next polynomial in the ordered cyclical progression. In another example, as illustrated in steps 808*a* and 808*b*, obtaining the different polynomial comprises calculating a function of a previous message, and selecting from the set a polynomial that is determined by the calculated result of the function. This may comprise for example calculating a function of a previous message and selecting from the set a polynomial that is a number of polynomials after the currently programmed characteristic polynomial according to the ordered cyclical progression, the number comprising the calculated result of the function. In another example, the set may be indexed by number, and the procedure may comprise selecting from the set a polynomial that has an index number corresponding to the calculated result of the function. Different examples of function may be envisaged, including for example addition of the 1s present in a binary message, a hash function of the message etc. In still further examples, other selection procedures may be envisaged, such as a random selection from the set by the constrained device.

Referring now to FIG. 8*b*, in step 810, the constrained device informs the entity of the previous message on which the selection of a different characteristic polynomial is based. This may comprise for example sending a dedicated message to the entity informing the entity of which previous message the selection of a different polynomial should be based on. This message may be repeated multiple times allowing for a majority criterion to be used by the entity, so addressing the risk of individual bit error in the message. In a further example, the constrained device may inform the entity directly of the different characteristic polynomial, for example including the different characteristic polynomial in the message sent in step 810 or as part of any other message. This may be appropriate for example if the constrained device uses a random selection procedure to select a different characteristic polynomial, meaning the entity cannot replicate the selection procedure independently, and should be informed by the constrained device of what characteristic polynomial to use.

In step 812, the constrained device checks for expiry of an encryption renewal trigger, which may for example comprise at least one of sending or receiving a periodic message for the purpose of maintaining a connection with the entity. The periodic message may be a Keep Alive message, a Heartbeat message or any other periodic message for the purpose of maintaining a connection between the device and the entity. The trigger may comprise at least one of the sending or receiving of a threshold number of periodic messages since configuring of the LFSR with the current characteristic polynomial. Alternatively, other examples of trigger may be envisaged, such as a timer, for example based on a system clock signal, or another event based trigger. In step 814, on expiry of the encryption renewal trigger, the constrained device configures the LFSR in accordance with the obtained different characteristic polynomial.

Steps 816 and 818 illustrate another manner in which the characteristic polynomial according to which the LFSR of the constrained device is configured may be renewed. In step 816, the constrained device receives an encryption reset message from the entity and, in step 818, the constrained device configures the LFSR in accordance with a default characteristic polynomial. The default characteristic polynomial may be programmed into the constrained device, affording the possibility of an encryption "reset" as discussed in further detail below with reference to FIGS. 9*a* and 9*b*.

The constrained device may also receive encrypted messages from the entity with which it is communicating. Such messages may be received before or after a renewal of the characteristic polynomial discussed above. In FIG. 8*b*, the example of an encrypted message received sometime after the renewal of the characteristic polynomial is illustrated. In step 820, the constrained device receives an encrypted message from the server and in step 822, the constrained device decrypts the encrypted message by applying a PRBS to the encrypted message. Step 822 may for example comprise applying the same PRBS to the encrypted message as is applied to encrypt a generated message, and may therefore be achieved by inputting the encrypted message to the LFSR configured according to the current characteristic polynomial.

In some examples of the present disclosure, the constrained device may additionally perform steps relating to error detection. Such steps are not illustrated in FIGS. 8*a* and 8*b* but are discussed in detail with reference to FIGS. 9*a* and 9*b*.

Figure 9A:
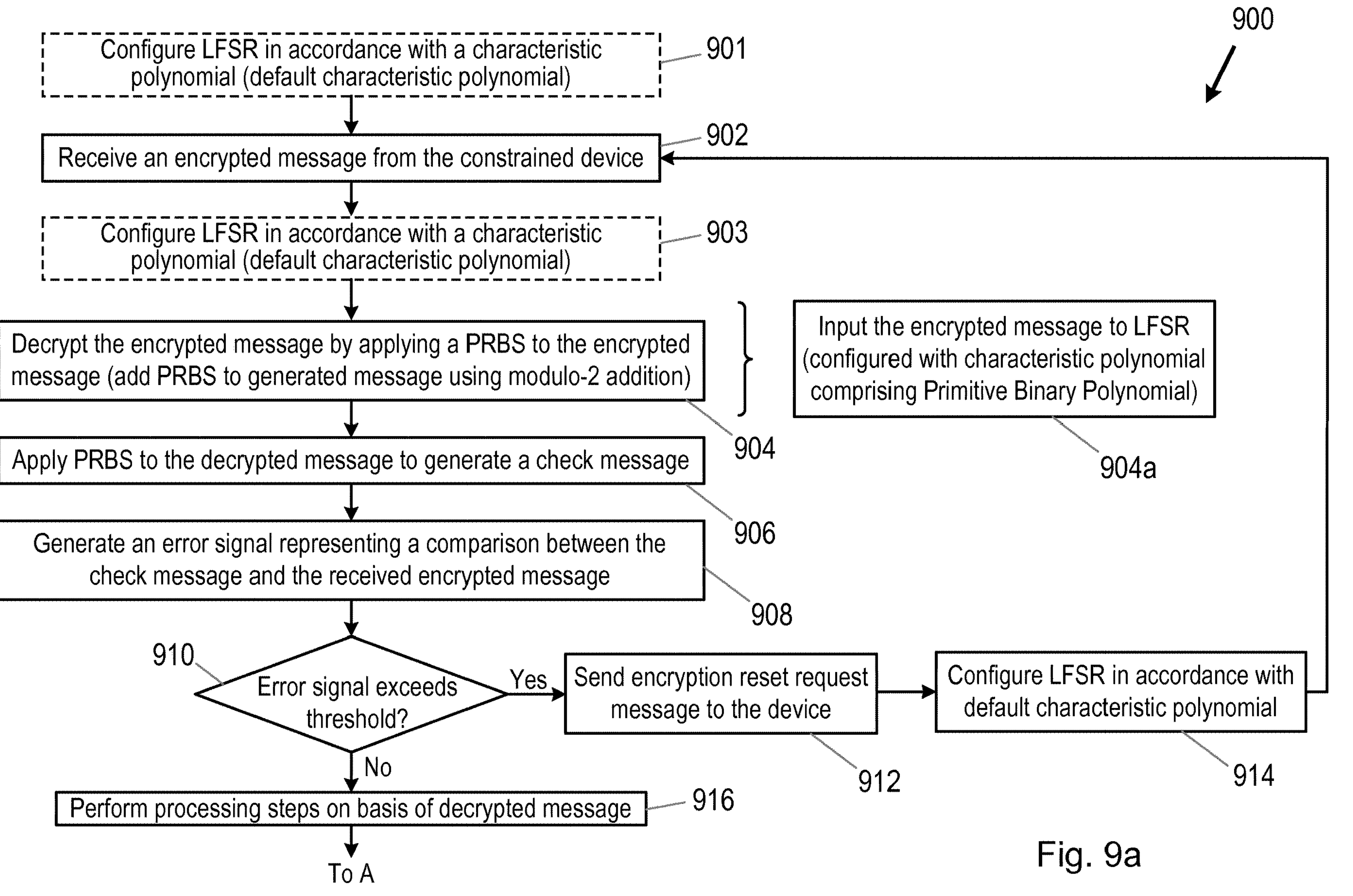
FIGS. 9*a* and 9*b* is a flow chart illustrating process steps in another example of a method for operating an entity.
Figure 9B:
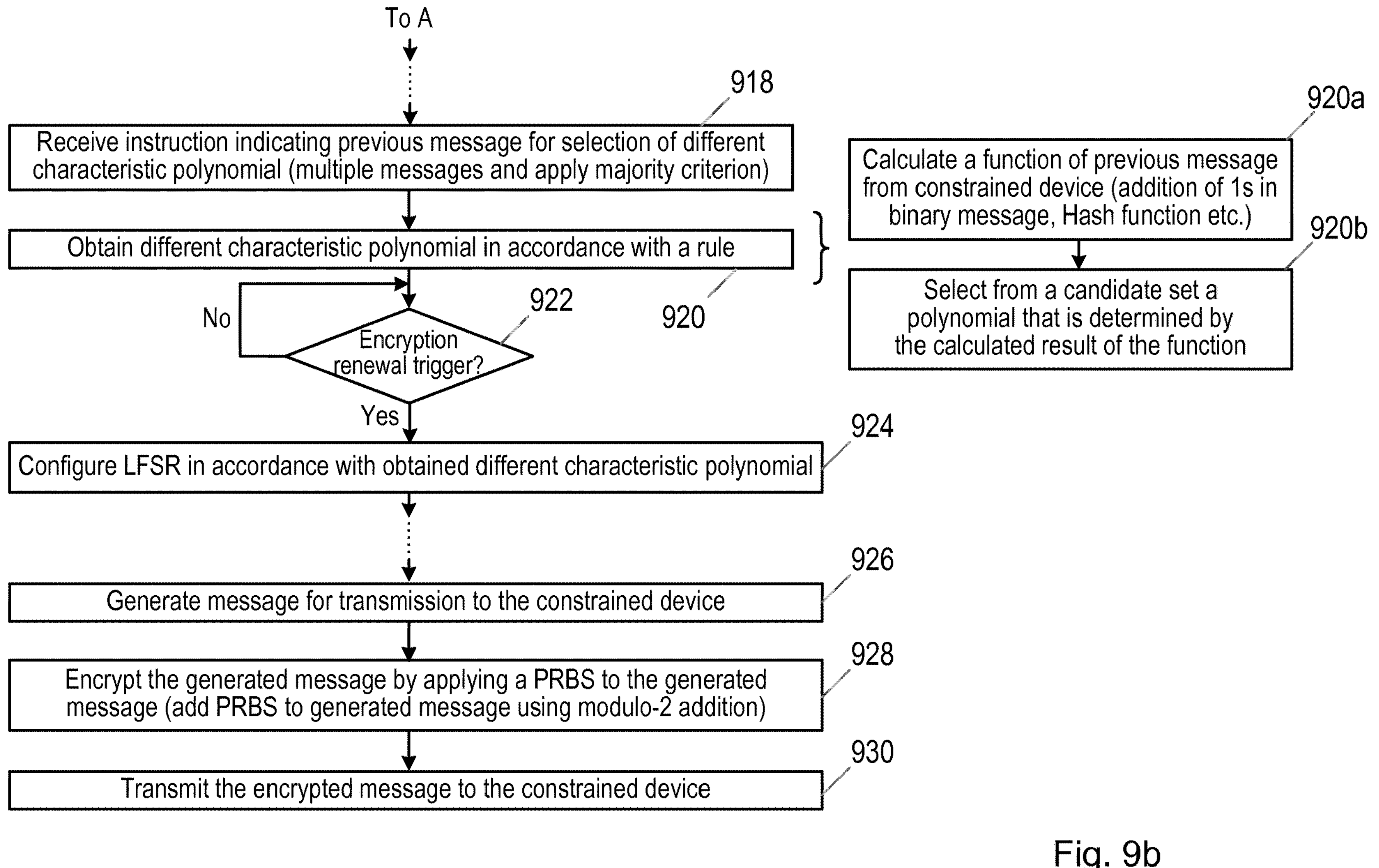

FIGS. 9*a* and 9*b* are flow charts illustrating process steps in another example of method 900 for operating an entity that is operable to cooperate with a constrained device. The steps of the method 900 illustrate one way in which the steps of the method 700 may be implemented and supplemented in order to achieve the above discussed and additional functionality. As for the method 700 of FIG. 7, the entity performing the method may be a physical or virtual entity including for example a server, a router, a virtualised network function hosted on a server or other equipment etc. In some examples, the entity may be an MQTT broker. The entity may be configured to communicate using any suitable communication protocol, including for example MQTT, CoAP, HTTP etc. In the example method of FIGS. 9*a* and 9*b*, it is assumed that the entity comprises a Linear Feedback Shift Register, implemented for example on a Programmable Logic Device such as a Complex Programmable Logic Device (CPLD) or a Field Programmable Gate Array (FPGA), which may be comprised within, connected to, or in communication with the device. In other examples, the LFSR may be implemented in software running on or accessible to the entity.

Referring initially to FIG. 9*a*, the method 900 comprises the step of configuring a LFSR in accordance with a characteristic polynomial, which may for example be a default characteristic polynomial selected and configured into the entity at manufacture or deployment of the entity. In other examples, the default characteristic polynomial may be configured into the entity on deployment of the constrained device or devices with which the entity is to cooperate. The configuring step may take place before or after a step of receiving an encrypted message from the constrained device with which the entity is operable to cooperate over a network. The configuring step is thus illustrated in FIG. 9*a* as either step 901, taking place before the step of receiving an encrypted message, or as step 903, taking place after receiving the encrypted message. The step 902 of receiving an encrypted message from the constrained device may comprise for example receiving a data message such as a publish message in MQTT or a CoAP report message or any other kind of data or control message according to any communication protocol.

In step 904, the entity decrypts the received message by applying a PRBS to the received message. The application of the PRBS comprises application using modulo-2 addition and is achieved by inputting the generated message to the LFSR that was configured with a characteristic polynomial in step 901 or 903. As illustrated in step 904*a*, the characteristic polynomial comprises in the present example a Primitive Binary Polynomial. The characteristic polynomial of the LFSR defines the tap positions for the LFSR to implement the modulo-2 addition of a PRBS to the generated message that is input to the LFSR, with a tap present at a position in the LFSR if a variable with an exponent corresponding to that position is present in the polynomial. This is discussed in further detail below with reference to FIG. 10.

Steps 906 to 912 illustrate an error detection process that the entity may carry out in order to detect a mismatch between the PRBS used for encryption at the constrained device and decryption at the entity. Such a mismatch may be caused by the respective LFSRs being configured according to different characteristic polynomials.

Referring still to FIG. 9*a*, in step 906, the entity applies the PRBS to the decrypted message to generate a check message, effectively re-encrypting the message. In step 908, the entity generates an error signal representing a comparison between the check message and the received encrypted message. In step 910, the entity determines whether the error signal exceeds a threshold. The threshold may for example comprise a value for the error signal, or may comprise a count of a number of times that the error signal toggles between signalling normal operation and signalling an error. If the error signal exceeds a threshold, the entity sends an encryption reset message to the constrained device in step 912, and then configures the LFSR in accordance with a default characteristic polynomial. The encryption reset request message will prompt the constrained device to similarly reconfigure its LFSR in accordance with the default characteristic polynomial, so "resetting" the encryption between the constrained device and the entity. The entity may then return to step 902 on receipt of a new encrypted message from the constrained device.

If the error signal does not exceed the threshold, then the received message is deemed to have been successfully decrypted, and the entity may proceed to perform processing steps on the basis of the decrypted message. In the case of a publish message received at an entity comprising an MQTT broker, this may comprise updating saved information for the topic contained in the message and forwarding the message to all subscribers to that topic. Other processing steps may be envisaged according to different examples of entity, communication protocol and received message.

Referring now to FIG. 9*b*, in step 918, the entity receives a message from the constrained device indicating a previous message on which selection of a different characteristic polynomial should be based. This message may for example be a dedicated message to the entity informing the entity of which previous message the selection of a different polynomial should be based on, or the information about which previous message should be used may be included as additional information in another message. In some examples, the message received at step 918 may be received multiple times, and the entity may apply a majority criterion to the received messages, so addressing a risk of individual bit error in the message. In a further example, the message received in step 918 may inform the entity directly of a different characteristic polynomial in accordance with which its LFSR should be configured. This may be appropriate for example if the constrained device uses a random selection procedure to select a different characteristic polynomial, meaning the entity cannot replicate the selection procedure independently, and should be informed by the constrained device of what characteristic polynomial to use.

In step 920, the entity obtains a different characteristic polynomial according to a rule. The different characteristic polynomial may be different in that it is different to the current characteristic polynomial, in accordance with which the LFSR is currently configured. The obtaining step 920 may be prompted by an event such as the expiry of a timer or by receipt of the message in step 918. In the illustrated example, the rule comprises a procedure for selecting a polynomial from a set of candidate polynomials. The set of candidate polynomials may for example be programmed into a memory of the entity, at manufacture or on deployment into the field or at any other suitable time. The set may comprise Primitive binary polynomials and may in some examples comprise Primitive Binary Trinomials. In one example, the procedure for selection of a different polynomial comprises an ordered cyclical progression through the set of candidate polynomials. Obtaining the different polynomial may comprise selecting from the set the next polynomial in the ordered cyclical progression. In another example, as illustrated in steps 920*a* and 920*b*, obtaining the different polynomial comprises calculating a function of a previous message (which message may have been specified in the message received at step 918), and selecting from the set a polynomial that is determined by the calculated result of the function. This may comprise for example calculating a function of a previous message and selecting from the set a polynomial that is a number of polynomials after the currently programmed characteristic polynomial according to the ordered cyclical progression, the number comprising the calculated result of the function. In another example, the set may be indexed by number, and the procedure may comprise selecting from the set a polynomial that has an index number corresponding to the calculated result of the function. Different examples of function may be envisaged, including for example addition of the 1s present in a binary message, a hash function of the message etc. In still further examples, other selection procedures may be envisaged, such as a random selection from the set by the entity.

In step 922, the entity checks for expiry of an encryption renewal trigger, which may for example comprise at least one of sending or receiving a periodic message for the purpose of maintaining a connection with the constrained device. The periodic message may be a Keep Alive message, a Heartbeat message or any other periodic message for the purpose of maintaining a connection between the entity and the constrained device. The trigger may comprise at least one of the sending or receiving of a threshold number of periodic messages since configuring of the LFSR with the current characteristic polynomial. Alternatively, other examples of trigger may be envisaged, such as a timer, for example based on a system clock signal, or another event based trigger. In step 924, on expiry of the encryption renewal trigger, the entity configures the LFSR in accordance with the obtained different characteristic polynomial.

The entity may also send encrypted messages to the constrained device with which it is cooperating. Such messages may be sent before or after a renewal of the characteristic polynomial discussed above. In FIG. 9*b*, the example of an encrypted message generated and sent sometime after the renewal of the characteristic polynomial is illustrated. In step 926, the entity generates a message for transmission to the constrained device and, in step 928, the entity encrypts the generated message by applying a PRBS to the generated message. Step 928 may for example comprise applying the same PRBS to the generated message as is applied to decrypt a received message, and may therefore be achieved by inputting the encrypted message to the LFSR configured according to the current characteristic polynomial. In step 930, the entity transmits the encrypted message to the constrained device.

Figure 10:
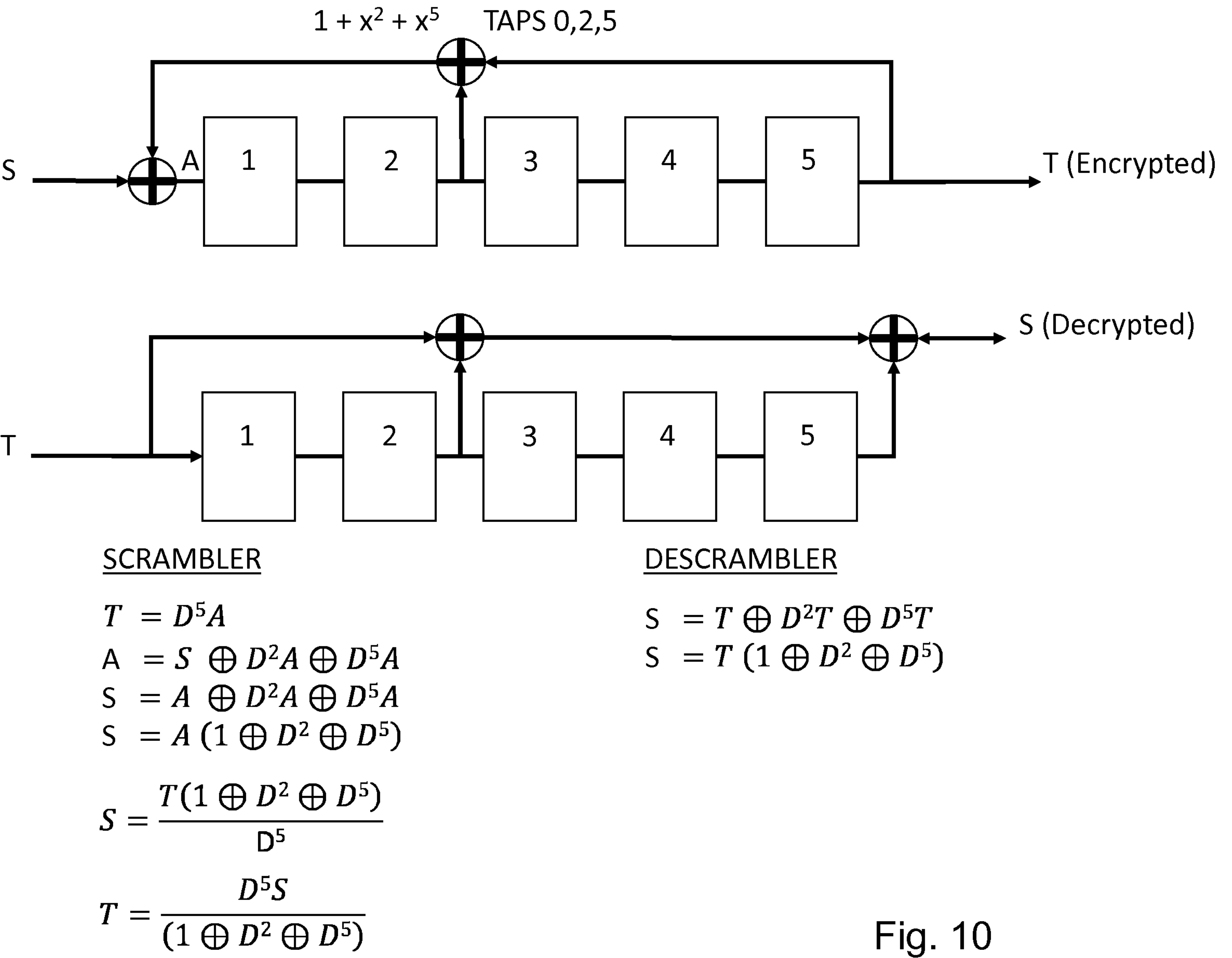
FIG. 10 illustrates an example of an LFSR.

As discussed above with reference to FIGS. 8*a*, 8*b*, 9*a* and 9*b*, encryption and decryption of messages according to examples of the present disclosure may be performed by inputting messages to a Linear Feedback Shift Register, configured according to a characteristic polynomial. FIG. 10 illustrates an example of an LFSR configured for encryption (upper configuration) and decryption (lower configuration) of messages according to the characteristic polynomial $1+x^2+x^5$. The LFSRs illustrated in FIG. 10 comprise a plurality of individual flip-flops, with taps positioned according to the characteristic polynomial. In the illustrated example of the characteristic polynomial $1+x^2+x^5$, the tap positions are at 0, 2 and 5, corresponding to the exponents of the variable in the polynomial.

Referring to FIG. 10, encrypted data T is generated from clear data S by passing the data through the flip-flops of the LFSR and the logic ports connecting the taps. The illustrated logic ports are Exclusive OR gates. In an opposite process, clear data S is recovered from encrypted data T by inputting the encrypted data T to the LFSR. The LFSR configured for decryption has taps in the same positions, and so is configured according to the same characteristic polynomial, but one logic gate is switched from position 0 to position 5, and the tap outputs are fed forward rather than backward. A mathematical demonstration of this example is also shown in FIG. 10.

It will be appreciated that the LFSR configured for decrypting an encrypted message is able to auto-synchronize to the incoming data flow, and therefore doesn't need an alignment word or a sync; it is sufficient to input incoming encrypted data to the circuit. A sample demonstration of this is illustrated at the end of the description section with reference to FIG. 18.

The characteristic polynomial according to which an LFSR may be configured may in some examples be a Primitive Binary Polynomial and may be a Primitive Binary Trinomial. A primitive polynomial is the minimal polynomial of a primitive element of the finite extension field $GF(p^m)$. All primitive polynomials are irreducible, but not all irreducible polynomials are necessarily primitive. A polynomial of degree n over the finite field GF(2) (i.e., a binary polynomial) is primitive if it has polynomial order $2^n-1$. A more detailed discussion of primitive binary polynomials, including a comprehensive test for primitivity of a polynomial, is set out in Wayne Stahnke, "Primitive Binary Polynomials", Mathematics of Computation, Volume 27, number 124 (Reference 1).

FIG. 11 is an extract of a table of Primitive Binary Polynomials, provided in: Miodrag Zivkovic, "A Table of Primitive Binary Polynomials", Mathematics of Computation, Volume 62, number 205 (Reference 2). In the table of FIG. 11, n is the degree of the polynomial, k is the number of terms in the polynomial and the table entries correspond to the exponents of the terms in the polynomial. Polynomials according to the illustrated table therefore take the form $1+x^n+\Sigma x^a$ where a takes the values from the table entry for n and a chosen k. With the exponents of the characteristic polynomial defining tap positions for the LFSR (and so "n" defining the number of flip-flips required), it can be seen from FIG. 11 that with less than 30 flip-flops a robust encryption/decryption circuit can be envisaged with multiple options for characteristic polynomials (and hence tap positions).

It will be appreciated that as the degree of the characteristic polynomial defines the number of flip-flops required to implement the LFSR, there may be advantages in configuring an LFSR in accordance with a characteristic polynomial having as small a degree as possible, and so requiring a minimum number of flip-flops. The greater the number of flip-flops required to implement the LFSR, the greater the amount of resources, and power consumption, as the flip-flops are the greatest power consumers in the component. Additionally, the configuration complexity of the LFSR increases with the number of flip-flops. Reference 1 provides an alternative table of 3- and 5-nomials of degrees up to 163 which seek to minimise the degree of at least the first term.

There may additionally be some advantages in limiting the number of terms in the characteristic polynomial, although any such advantages are likely to be less significant that those obtained from limiting the degree of the characteristic polynomial. In commercial programmable devices, two programmable logical ports are conventionally provided per flip-flop, ensuring that an LFSR can be configured according to a characteristic polynomial having multiple terms without changing the device size.

The advent of low cost Programmable Logic Devices means that an encryption circuit can be incorporated into a constrained device with minimal expense. Example Complex Programmable Logic Devices (CPLDs) are available in the range of 1 US$. In the case of an entity cooperating with a constrained device, a larger component such as a Field Programmable Gate Array (FPGA) may be appropriate. A single entity may be cooperating with multiple constrained devices, some or all of which may be using different characteristic polynomials, or may not be using encryption at all. A FPGA offers the capacity for multiple LFSRs to be configured in one component, together with a bypass circuit, allowing for non-encrypted messages to be received without passing through a LFSR.

Figure 12:
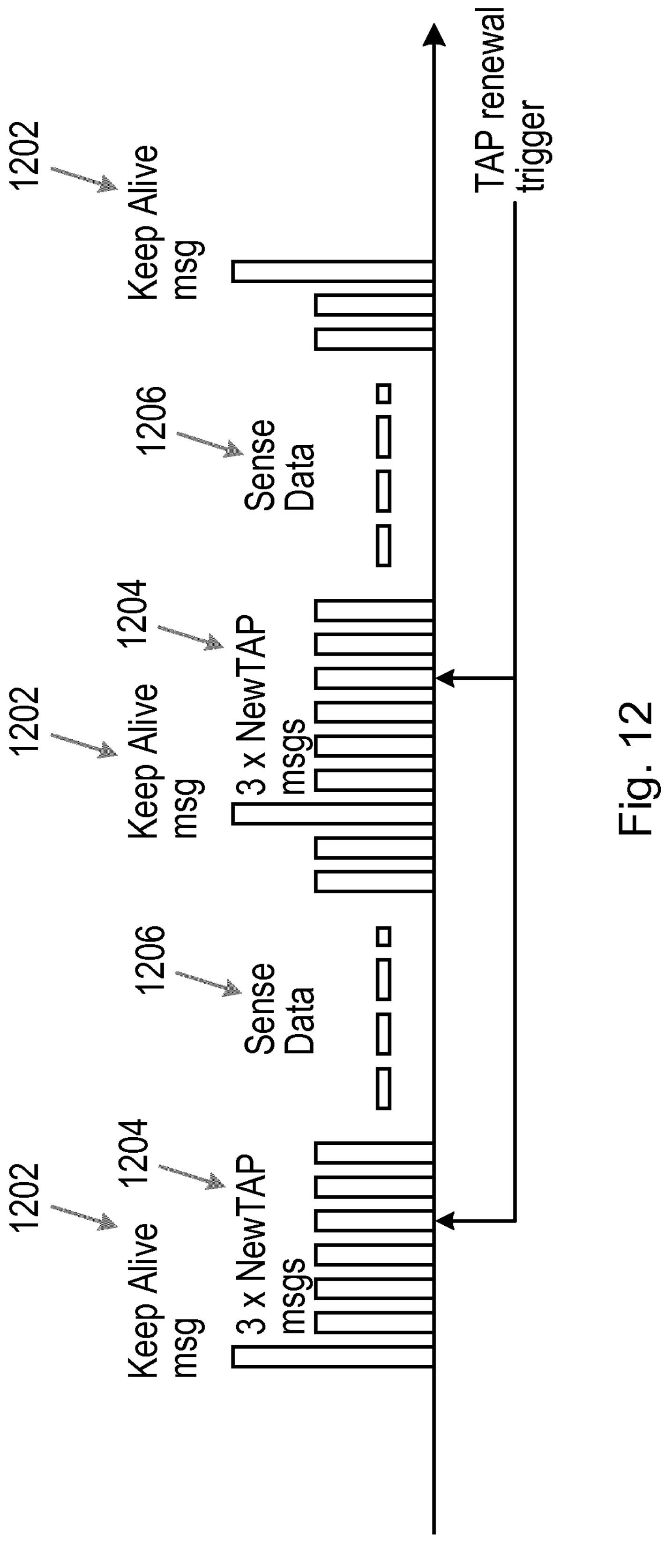
FIG. 12 illustrates a renewal of characteristic polynomial.

FIG. 12 illustrates in greater detail a renewal of characteristic polynomial according to one example of the present disclosure. FIG. 12 is a timing diagram illustrating messages sent by a constrained device to an entity over a network. The messages include periodic Keep Alive messages 1202, new configuration messages 1204 and sensor data messages 1206. After each Keep Alive message 1202, a "new tap" message is sent informing the entity of the new tap configuration for the LFSR, and consequently the new characteristic polynomial. This new tap message is sent three times, allowing the entity to apply a majority criterion and mitigate the risk of bit errors in the message. After receipt of the three "new tap" messages, the constrained device and entity both update the configuration of their LFSRs, and sense data is encrypted and sent by the constrained device to the entity using the new tap configuration. According to different examples, the new tap configuration messages and update of the tap configuration may be conducted after each Keep Alive message or after N Keep Alive messages, where N may take any appropriate value according to operational constraints and priorities.

The process used to select a new tap configuration (equivalent to a new characteristic polynomial) may vary according to different implementations. In one example, a constrained device and entity may switch cyclically through a certain number of options, or one of the constrained device or scrambler may decide in an arbitrary or random manner what should be the next characteristic polynomial and communicate this to the other of the entity and constrained device. In a still further example, the last published message including device sensor data may be used to calculate the number of rows to jump in a table of suitable polynomials. In one example, the total number of 1s in the message may determine the number of rows to jump. In another example, the message may be input to a hash function. In examples in which a previous message is used to determine the next tap configuration, that message may be repeated several times in order to allow use of a majority criterion at the receiver to reduce sensitivity to bit error in the message. The renewal process for tap configuration allows for simultaneous application (and in some examples selection) of a new tap configuration (or characteristic polynomial) in both the device and entity. The encryption parameters for data are thus dynamically renewed, so increasing the robustness of the security provided by examples of the present disclosure. The implementation variables of when to switch to a new tap configuration and what selection procedure to use for the new tap configuration may be chosen according to the capacities of individual devices and other operational parameters and priorities.

Figure 13:
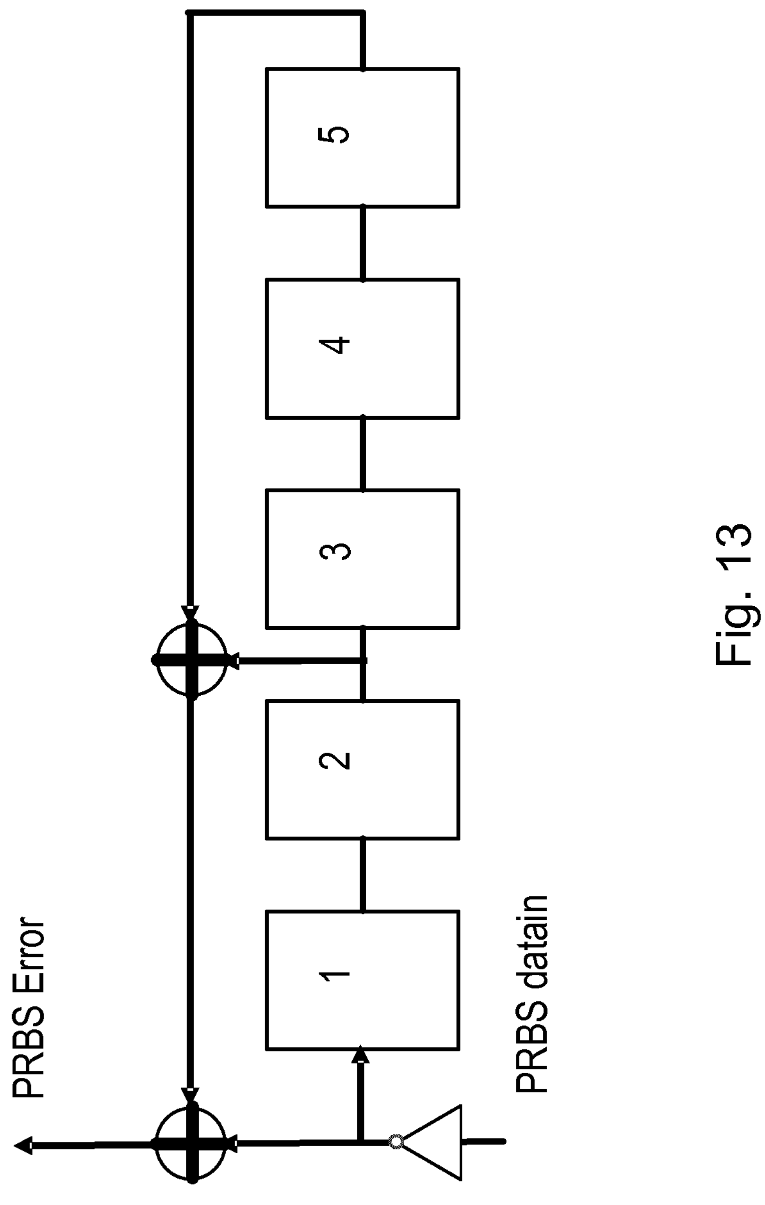
FIG. 13 illustrates an LFSR configured to implement error detection.

FIG. 13 illustrates one way in which an error detection process may be incorporated into examples of the present disclosure without adding significant complication. Such a process may be useful in the case of a noisy channel on which a high bit error rate may impair the exchange of messages for selection of a new tap configuration. FIG. 13 illustrates an implementation of an LFSR configured according to the characteristic polynomial $1+x^2+x^5$. The taps for decryption are not illustrated, but it will be appreciated that an output of the logic device 5 provides the decrypted clear text. As illustrated in FIG. 13, with the addition of only two extra logic interconnections, the obtained clear text may be re-encrypted with the same PRBS, and the resulting re-encrypted text may be compared with the incoming encrypted text. The comparison signal, illustrated in FIG. 13 as PRBS Error, will toggle between 0 and 1 if there is a mismatch between the incoming encrypted data and the re-encrypted data. In the event of an error burst impacting the new tap combination exchange (including any of the messages involved in the renewal of tap combination according to the different examples discussed above), the resulting mismatch between the tap combination at the device and the tap combination at the entity will cause the PRBS Error signal to start to toggle continuously. This may be used as an Error identifier. In one example, a count may be kept of toggles in the PRBS Error signal, and an encryption reset may be triggered if the count exceeds a threshold. The encryption reset may comprise instructing the device to revert to a default tap combination. In another example, the entity may simply close and restart the connection to the device, so reverting to the default tap configuration used on start-up. The default tap configuration may be hard-encoded into both the device and the entity.

Figure 14:
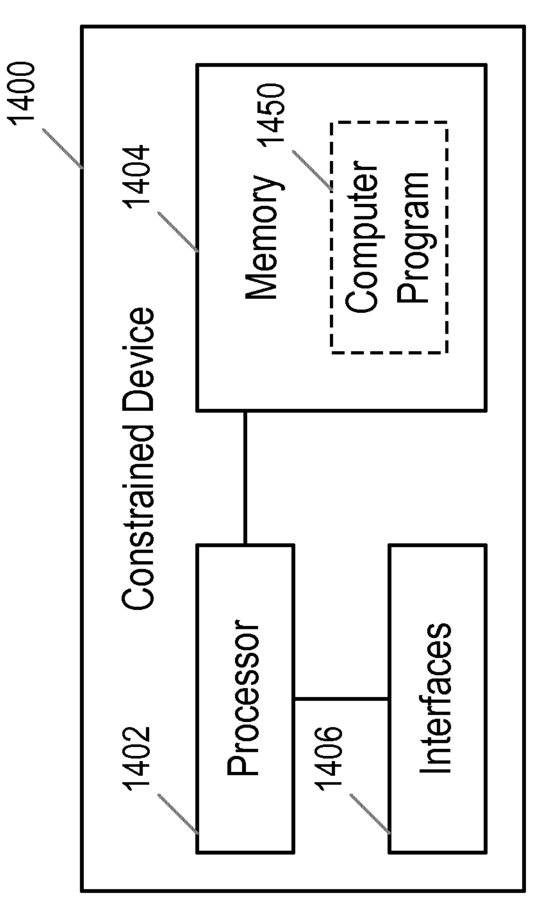
FIG. 14 is a block diagram illustrating functional elements in a constrained device.

As discussed above, the methods 600, 800 may be performed by a constrained device. FIG. 14 is a block diagram illustrating an example constrained device 1400 which may implement the methods 600, 800 according to examples of the present disclosure, for example on receipt of suitable instructions from a computer program. Referring to FIG. 14, the constrained device 1400 comprises a processor or processing circuitry 1402, a memory 1404 and interfaces 1406. The memory 1404 contains instructions executable by the processor or processing circuitry 1402 such that the constrained device 1400 is operative to conduct the steps of the method 600 and/or 800. The instructions may also include instructions for executing one or more telecommunications and/or data communications protocols. The instructions may be stored in the form of the computer program 1450. In some examples, the processor or processing circuitry 1402 may include one or more microprocessors or microcontrollers, as well as other digital hardware, which may include digital signal processors (DSPs), special-purpose digital logic, etc. The processor or processing circuitry 1402 may be implemented by any type of integrated circuit, such as an Application Specific Integrated Circuit (ASIC), Field Programmable Gate Array (FPGA) etc. The memory 1404 may include one or several types of memory suitable for the processor, such as read-only memory (ROM), random-access memory, cache memory, flash memory devices, optical storage devices, solid state disk, hard disk drive etc.

Figure 15:
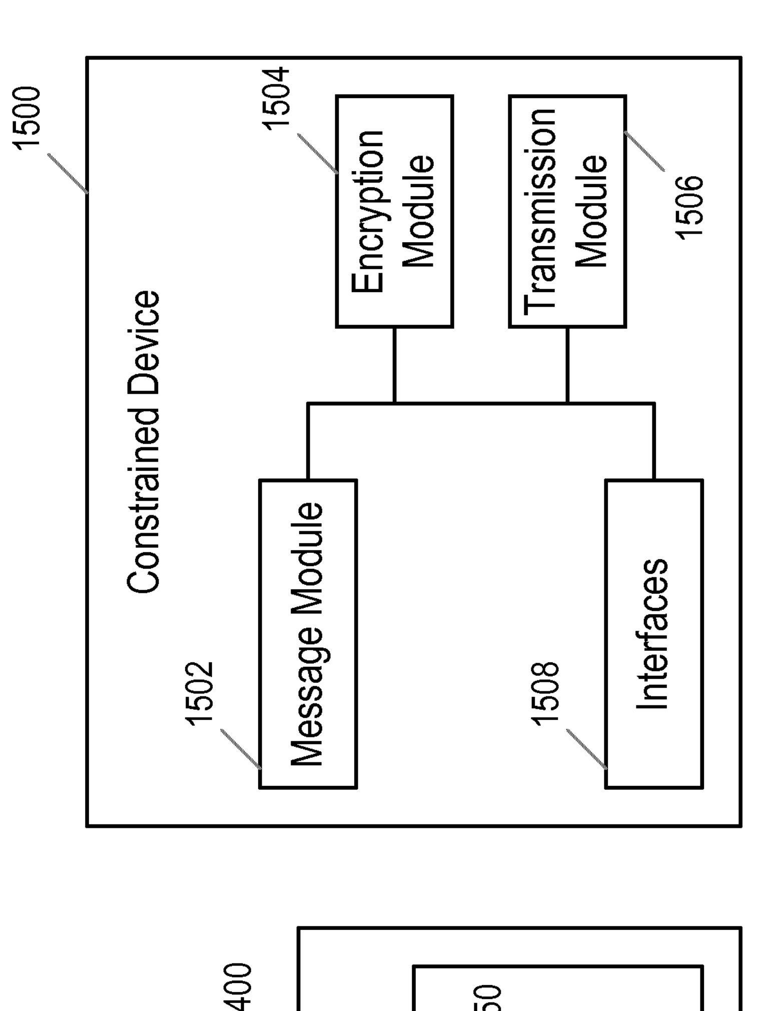
FIG. 15 is a block diagram illustrating functional elements in another example of constrained device.

FIG. 15 illustrates functional units in another example of constrained device 1500 which may execute examples of the methods 600, 800 of the present disclosure, for example according to computer readable instructions received from a computer program. It will be understood that the units illustrated in FIG. 15 are functional units, and may be realised in any appropriate combination of hardware and/or software. The units may comprise one or more processors and may be integrated to any degree.

Referring to FIG. 15, the constrained device 1500 comprises a message module 1502 for generating a message for transmission to the entity and an encryption module 1502 for encrypting the generated message by applying a PRBS to the generated message. The constrained device 1500 further comprises a transmission module 1504 for transmitting the encrypted message to the entity and interfaces 1508.

Figure 16:
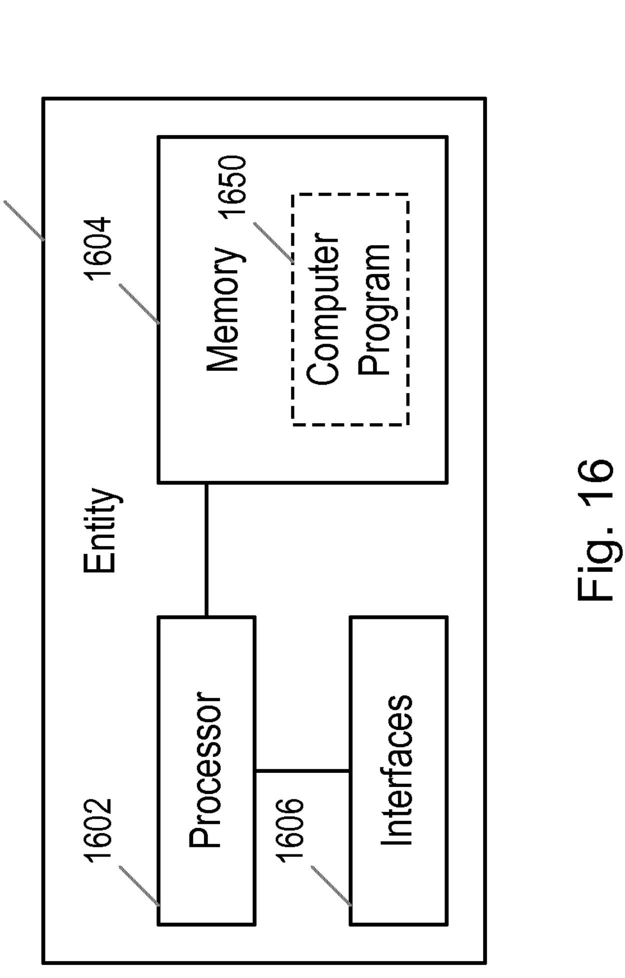
FIG. 16 is a block diagram illustrating functional elements in an entity.

Also as discussed above, the methods 700, 900 may be performed by an entity such as a server or broker. FIG. 16 is a block diagram illustrating an example entity 1600 which may implement the methods 700, 900 according to examples of the present disclosure, for example on receipt of suitable instructions from a computer program. Referring to FIG. 16, the entity 1600 comprises a processor or processing circuitry 1602, a memory 1604 and interfaces 1606. The memory 1604 contains instructions executable by the processor or processing circuitry 1602 such that the entity 1600 is operative to conduct the steps of the method 700 and/or 900. The instructions may also include instructions for executing one or more telecommunications and/or data communications protocols. The instructions may be stored in the form of the computer program 1650. In some examples, the processor or processing circuitry 1602 may include one or more microprocessors or microcontrollers, as well as other digital hardware, which may include digital signal processors (DSPs), special-purpose digital logic, etc. The processor or processing circuitry 1602 may be implemented by any type of integrated circuit, such as an Application Specific Integrated Circuit (ASIC), Field Programmable Gate Array (FPGA) etc. The memory 1604 may include one or several types of memory suitable for the processor, such as read-only memory (ROM), random-access memory, cache memory, flash memory devices, optical storage devices, solid state disk, hard disk drive etc.

Figure 17:
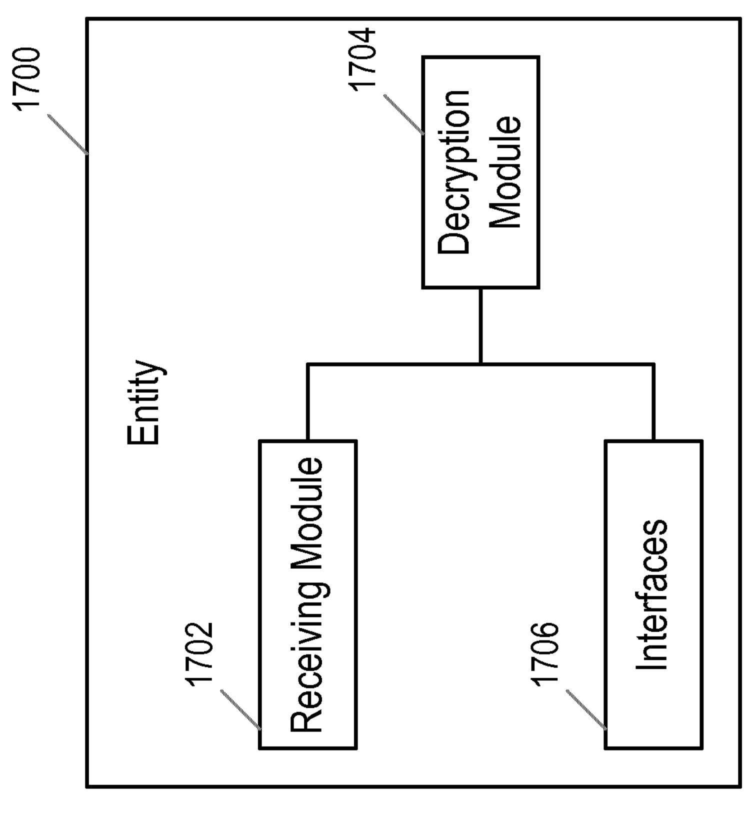
FIG. 17 is a block diagram illustrating functional elements in another example of entity.

FIG. 17 illustrates functional units in another example of entity 1700 which may execute examples of the methods 700, 900 of the present disclosure, for example according to computer readable instructions received from a computer program. It will be understood that the units illustrated in FIG. 17 are functional units, and may be realised in any appropriate combination of hardware and/or software. The units may comprise one or more processors and may be integrated to any degree.

Referring to FIG. 17, the entity 1700 comprises a receiving module 1702 for receiving an encrypted message from the constrained device, a decrypting module 1704 for decrypting the encrypted message by applying a PRBS to the encrypted message and interfaces 1706.

It will be appreciated from the above discussion that aspects of the present disclosure provide methods and apparatus that offer a cost effective security solution for communication with constrained devices. Development of IoT protocols is towards light and very cost-effective solutions that are increasingly vulnerable to security risks. Existing security solutions such as TLS are not always applicable and impose additional resource costs, which are often incompatible with a deployment environment in which light weight protocols may be used.

Examples of the present disclosure propose a security solution which may be implemented on specialized low cost dedicated hardware (such as a PLD), which solution offers advantages in terms of costs, security and CPU offload. Examples of the present disclosure are based on the binary polynomial theory that offers a light implementation and is highly suited to the IoT/M2M case. According to certain examples, dynamic encryption polynomial selection may periodically and simultaneously take place in both a device and a communicating entity such as an MQTT broker, so increasing the security of communication. According to further examples, an error detection process and failure recovery mechanism may be used to mitigate the effects of noisy channels whose bit error rate could otherwise impact encryption results.

While examples of the resent disclosure have been discussed in the context of MQTT, the methods and apparatus described herein may be applied to any protocol used for communication with or by a constrained device to add a light and, in some examples, dynamically renewing encryption layer. The solutions described herein achieve robust protection without impacting the cost effectiveness of IoT protocols including MQTT, or even simpler and more vulnerable protocols such as MQTT-SN. Implementation of the solutions described herein is cost effective with no impact on the usually scarce CPU resources available in a constrained device.

EXAMPLE SIMULATION

The following Java Code provides a simple encryption simulation demonstrating an example method according to the present disclosure. The results of the simulation are illustrated in FIG. 18. The column "input" in FIG. 18 represents a clear text input for encryption, the column "scram_input" represents encrypted text input to a receiver, and the column "output" represents the recovered output after decryption. It can be seen from FIG. 18 that after the first few rows, the receiver has succeeded in auto-synchronizing with the sender, and clear text is correctly recovered at the output.

Java Code for Encryption Simulation:

```
/* Scrambler.java
     Polinomio 1 + x5 + x2
 */
public class scrambler
{
     public static void main(String[ ] args) {
          boolean i = false;
          boolean s = false;
          int input, scram__input, output;
          boolean[ ] reg = {false, true, false, true, false, true};
          boolean[ ] ric = {true, false, true, false, true, false};
     while (true) {
          if (i!=false) i=false;
               else i=true;
               reg[5] = reg[4];
               reg[4] = reg[3];
               reg[3] = reg[2];
               reg[2] = reg[1];
               reg[1] = reg[0];
               reg[0] = i^reg[2]^reg[5];
               ric[5] = ric[4];
               ric[4] = ric[3];
               ric[3] = ric[2];
               ric[2] = ric[1];
               ric[1] = ric[0];
               ric[0] = reg[0];
               s = reg[0]^ric[2]^ric[5];
               if (i==true) input=0;
               else input=1;
               if (reg[5]==true) scram__input=0;
               else scram__input=1;
               if (s==true) output=0;
               else output=1;
          System.out.println("input= "+input+" scram__input= "+scram__input+"
output= "+output);
     }
```

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

It should be noted that the above-mentioned examples illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method performed by a constrained device that is operable to communicate with an entity over a network, the method comprising:

generating a message for transmission to the entity;

encrypting the generated message by applying a Pseudo Random Binary Sequence (PRBS) to the generated message, wherein the PRBS is based on a first characteristic polynomial and a Linear Feedback Shift Register (LFSR) of the constrained device is configured according to the first characteristic polynomial; and transmitting the encrypted message to the entity, wherein the encrypted message excludes and is not transmitted with any identification of the first characteristic polynomial.

2. The method of claim 1, wherein applying the PRBS to the generated message comprises one or more of the following:

adding the PRBS to the generated message using modulo-2 addition, and inputting the generated message to the LFSR configured according to the first characteristic polynomial.

3. The method of claim 1, wherein the first characteristic polynomial is one of the following: a Primitive Binary Polynomial or a default polynomial.

4. The method of claim, 3, further comprising, upon expiry of an encryption renewal trigger, configuring the LFSR in accordance with a second characteristic polynomial different from the first characteristic polynomial.

5. The method of claim 4, wherein the encryption renewal trigger comprises at least one of sending or receiving a periodic message for the purpose of maintaining a connection with the entity.

6. The method of claim 4, further comprising obtaining the second characteristic polynomial based on one of the following:

selecting a next candidate polynomial, from a set of candidate polynomials, based on an ordered cyclical progression through the set of candidate polynomials;

calculating a function of a previous message and selecting from the set of candidate polynomials a polynomial that is determined by the calculated result of the function; or calculating a function of a previous message and selecting from the set of candidate polynomials a polynomial that is a number of polynomials after the currently programmed characteristic polynomial, the number comprising the calculated result of the function.

7. The method of claim 6, further comprising sending to the entity a further message indicating one or more of the following:

the previous message on which the selection of the second characteristic polynomial is based; and the second characteristic polynomial.

8. The method of claim 1, further comprising:

receiving a second encrypted message from the entity; and decrypting the second encrypted message by applying the PRBS to the second encrypted message, thereby generating a second message.

9. The method of claim 8, further comprising:

applying the PRBS to the second message to generate a check message;

generating an error signal representing a comparison between the check message and the second encrypted message; and when the error signal exceeds a threshold, sending an encryption reset message to the entity and configuring the LFSR in accordance with a default characteristic polynomial.

10. A method performed by an entity operable to communicate with a constrained device over a network, the method comprising:

receiving an encrypted message from the constrained device; and decrypting the encrypted message by applying a Pseudo Random Binary Sequence (PRBS) to the encrypted message, wherein:

the PRBS is based on a first characteristic polynomial, a Linear Feedback Shift Register (LFSR) of the entity is configured according to the first characteristic polynomial, and the encrypted message excludes and is not transmitted with any identification of the first characteristic polynomial.

11. The method of claim 10, wherein applying the PRBS to the encrypted message comprises one or more of the following:

adding the PRBS to the encrypted message using modulo-2 addition; and inputting the encrypted message to the LFSR configured according to the first characteristic polynomial.

12. The method of claim 10, wherein the first characteristic polynomial is one of the following: a Primitive Binary Polynomial or a default polynomial.

13. The method of claim 12, further comprising, upon expiry of an encryption renewal trigger, configuring the LFSR in accordance with a second characteristic polynomial different from the first characteristic polynomial.

14. The method of claim 13, wherein the encryption renewal trigger comprises at least one of sending or receiving a periodic message for the purpose of maintaining a connection with the constrained device.

15. The method of claim 13, further comprising obtaining the second characteristic polynomial based on one of the following:

selecting a next candidate polynomial, from a set of candidate polynomials, based on an ordered cyclical progression through the set of candidate polynomials;

calculating a function of a previous message and selecting from the set of candidate polynomials a polynomial that is determined by the calculated result of the function; or calculating a function of a previous message and selecting from the set of candidate polynomials a polynomial that is a number of polynomials after the currently programmed characteristic polynomial, the number comprising the calculated result of the function.

16. The method of claim 15, wherein obtaining the second characteristic polynomial is further based on receiving from the constrained device a further message indicating one or more of the following: the second characteristic polynomial, and the previous message on which the selection of the second characteristic polynomial is to be based.

17. The method of claim 10, further comprising:

applying the PRBS to the decrypted message to generate a check message;

generating an error signal representing a comparison between the check message and the received encrypted message; and when the error signal exceeds a threshold, sending an encryption reset message to the constrained device and configuring the LFSR in accordance with a default characteristic polynomial.

18. The method of claim 10, further comprising:

generating a second message for transmission to the constrained device;

encrypting the second message by applying the PRBS to the second message; and transmitting the encrypted second message to the constrained device.

19. A constrained device operable to communicate with an entity over a network, the constrained device comprising:

a processor; and a memory storing instructions executable by the processor, whereby execution of the instructions configures the constrained device to:

generate a message for transmission to the entity;

encrypt the generated message by applying a Pseudo Random Binary Sequence (PRBS) to the generated message, wherein the PRBS is based on a first characteristic polynomial and a Linear Feedback Shift Register (LFSR) of the constrained device is configured according to the first characteristic polynomial; and transmit the encrypted message to the entity, wherein the encrypted message excludes and is not transmitted with any identification of the first characteristic polynomial.

20. An entity operable to communicate with a constrained device over a network, the entity comprising:

a processor; and a memory storing instructions executable by the processor, whereby execution of the instructions configures the entity to:

receive an encrypted message from the constrained device; and decrypt the encrypted message by applying a Pseudo Random Binary Sequence (PRBS) to the encrypted message, wherein:

the PRBS is based on a first characteristic polynomial, a Linear Feedback Shift Register (LFSR) of the entity is configured according to the first characteristic polynomial, and the encrypted message excludes and is not transmitted with any identification of the first characteristic polynomial.

* * * * *